US011087409B1

(12) United States Patent
Bobley et al.

(10) Patent No.: US 11,087,409 B1
(45) Date of Patent: Aug. 10, 2021

(54) SYSTEMS AND METHODS FOR GENERATING ACCURATE TRANSACTION DATA AND MANIPULATION

(71) Applicant: Ocrolus, LLC, New York, NY (US)

(72) Inventors: Sam Bobley, Glen Head, NY (US); Michael Yang, Jersey City, NJ (US)

(73) Assignee: Ocrolus, LLC, New York, NY (US)

( * ) Notice: Subject to any disclaimer, the term of this patent is extended or adjusted under 35 U.S.C. 154(b) by 1089 days.

(21) Appl. No.: 15/420,005

(22) Filed: Jan. 30, 2017

Related U.S. Application Data

(60) Provisional application No. 62/288,627, filed on Jan. 29, 2016.

(51) Int. Cl.

| | |
|---|---|
| *G06Q 40/02* | (2012.01) |
| *G06K 9/18* | (2006.01) |
| *G06K 9/03* | (2006.01) |
| *G06F 16/50* | (2019.01) |
| *G06Q 40/00* | (2012.01) |
| *G06Q 10/06* | (2012.01) |
| *G06K 9/00* | (2006.01) |
| *G06K 9/62* | (2006.01) |
| *G06F 16/33* | (2019.01) |

(52) U.S. Cl.
CPC ......... *G06Q 40/12* (2013.12); *G06F 16/3331* (2019.01); *G06F 16/50* (2019.01); *G06K 9/00442* (2013.01); *G06K 9/03* (2013.01); *G06K 9/18* (2013.01); *G06K 9/6201* (2013.01); *G06Q 10/06395* (2013.01); *G06Q 40/02* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,666,490 | A | 9/1997 | Gillings et al. |
| 5,852,685 | A | 12/1998 | Shepard |
| 6,351,574 | B1 | 2/2002 | Yair et al. |
| 7,039,256 | B2 | 5/2006 | Zlotnick et al. |

(Continued)

OTHER PUBLICATIONS

Sukhpreet Singh, "Optical Character Recognition Techniques: A Survey", Journal of Emerging Trends in Computing and Information Sciences, vol. 4, No. 6 Jun. 2013 (Year: 2013).*

*Primary Examiner* — Thomas L Mansfield
(74) *Attorney, Agent, or Firm* — Dentons US LLP

(57) ABSTRACT

In a system and method for auditing transactions where a set of image based transactions are received over a communications network, and stored in a central data store, the set of image based transactions are associated with a unique identifier associated with a user. A transaction format is identified from the set of image based transactions, utilizing a processor to apply a preprocessing to the set of image based transaction based on the identifying. The preprocessed image based transactions are processed into a series of text based transactions, wherein each image based transaction has a related text based transactions and each text based transaction has a plurality of data representing the transaction. The plurality of data for each text based transaction is stored and a quality identifier is associated with each text based transaction. An identifier is applied to a text based transaction based on the quality identifier.

20 Claims, 48 Drawing Sheets

(56) References Cited

U.S. PATENT DOCUMENTS

| | | | |
|---|---|---|---|
| 7,231,593 B1 | 6/2007 | Raja et al. | |
| 7,289,685 B1 | 10/2007 | Wolff et al. | |
| 7,570,842 B2 | 8/2009 | Suenaga et al. | |
| 7,882,427 B2 | 2/2011 | Raja et al. | |
| 8,249,399 B2 | 8/2012 | Barkan et al. | |
| 8,270,720 B1 | 9/2012 | Ladd et al. | |
| 8,331,739 B1* | 12/2012 | Abdulkader | G06K 9/033 358/1.11 |
| 8,386,535 B2 | 2/2013 | Luo et al. | |
| 8,655,075 B2 | 2/2014 | Wyle et al. | |
| 8,667,410 B2 | 3/2014 | Schacht | |
| 8,731,233 B2 | 5/2014 | Anisimovich et al. | |
| 8,953,910 B2 | 2/2015 | Itoh et al. | |
| 9,632,686 B1* | 4/2017 | Howard | G06F 3/0485 |
| 9,824,270 B1* | 11/2017 | Mao | G06K 9/00469 |
| 2002/0156827 A1 | 10/2002 | Lazar | |
| 2003/0231344 A1 | 12/2003 | Fast | |
| 2005/0289182 A1 | 12/2005 | Pandian et al. | |
| 2007/0033118 A1 | 2/2007 | Hopkinson | |
| 2009/0108080 A1* | 4/2009 | Meyer | G06Q 20/102 235/494 |
| 2009/0254572 A1* | 10/2009 | Redlich | G06Q 10/06 |
| 2010/0067794 A1 | 3/2010 | Barkan et al. | |
| 2010/0161460 A1 | 6/2010 | Vroom et al. | |
| 2011/0078254 A1 | 3/2011 | Stratton et al. | |
| 2011/0164468 A1 | 6/2011 | Dubnicki | |
| 2011/0258170 A1 | 10/2011 | Duggan et al. | |
| 2012/0027246 A1 | 2/2012 | Tifford et al. | |
| 2012/0290601 A1* | 11/2012 | Huang | G06K 9/00469 707/769 |
| 2013/0031145 A1 | 1/2013 | Luo et al. | |
| 2014/0010452 A1* | 1/2014 | Wyle | G06K 9/726 382/182 |
| 2014/0129483 A1 | 5/2014 | Isaev et al. | |
| 2014/0181056 A1* | 6/2014 | Pidduck | G06F 16/2365 707/697 |
| 2014/0279323 A1 | 9/2014 | Kliatskine et al. | |
| 2015/0012339 A1* | 1/2015 | Onischuk | G07C 13/00 705/12 |
| 2015/0070724 A1* | 3/2015 | Kamimoto | G06F 3/1275 358/1.15 |
| 2016/0012465 A1* | 1/2016 | Sharp | G06Q 20/18 705/14.17 |

* cited by examiner

FIG. 2

CHASE

TRANSACTION DETAIL *(continued)*

December 05, 2009 through January 07, 2010
Primary Account:

| DATE | DESCRIPTION | | AMOUNT | BALANCE |
|---|---|---|---|---|
| 12/09 | ODP Transfer From Savings | | 50.00 | 74.29 |
| 12/09 | ODP Transfer Fee | | -10.00 | 64.29 |
| 12/09 | Check  # 1014 | | -35.00 | 29.29 |
| 12/14 | Telephone Transfer from Sav Xxxxxx5401 | | 3,500.00 | 3,529.29 |
| 12/14 | Card Purchase  12/12 Haband 800-2131220 NJ Card 9638 | | -39.98 | 3,489.31 |
| 12/15 | Check  # 987 | 9638 | -167.66 | 3,321.65 |
| 12/17 | State Ins Fund Wrkrs Comp  PPD ID: | | 160.00 | 3,481.65 |
| 12/18 | Check  # 988 | | -1,250.00 | 2,231.65 |
| 12/18 | Check  # 989 | | -185.00 | 2,046.65 |
| 12/18 | Card Purchase  12/16 Josephines Shopping 631-7366181 NY Card 9638 | | -137.69 | 1,908.96 |
| 12/18 | Card Purchase  12/17 Haband 800-2131220 NJ Card | | -9.99 | 1,898.97 |
| 12/21 | Check  # 1015 | | -37.00 | 1,861.97 |
| 12/21 | Card Purchase  12/18 Haband 800-2131220 NJ Card | | -19.99 | 1,841.98 |
| 12/22 | Long Island  Cable Pmnt  PPD ID: | | -189.86 | 1,652.12 |

300

PREV | NEW TXN | Page 4 of 66 | NEXT

FIG. 3

| | | | |
|---|---|---|---|
| 12/23 | Point Of Sale Withdrawal THE BODY SHOP AT ROOSEVGARDEN CITY NYUS | -88.64 | 1,803.93 |
| 12/23 | Point Of Sale Withdrawal C WONDER - US4004 630 OLD COUNTRY RD#2084GARDEN CITY NYUS | -92.07 | 1,711.86 |
| 12/23 | Point Of Sale Withdrawal DUNKIN Q35 336 N BROADWAY JERICHO N | -2.16 | 1,709.70 |
| 12/23 | Point Of Sale Withdrawal CNS RITE AID CORP. 762481 195 8TH AVE NEWYORK | -28.62 | 1,681.08 |
| 12/24 | Point Of Sale Withdrawal ALTER EGO HAIR STUDIO 505 JERICHO TPKE SYOSSET NY | -60.00 | 1,621.08 |
| 12/24 | Point Of Sale Withdrawal STOP + SHOP 177 FOREST AVE GLEN COVE NYUS | -62.46 | 1,558.62 |
| 12/24 | Point Of Sale Withdrawal PATHMARK #608 130 WHEATLEY PLAZA GREENVALE NYUS | -31.19 | 1,527.43 |
| 12/26 | Point Of Sale Withdrawal NEW CHARMEDLY SPA + NA 240 GLEN HEAD RD GLEN HEAD N | -25.00 | 1,502.43 |
| 12/26 | Point Of Sale Withdrawal DD/BR Q35 285 -291 GLEN ST GLEN COVE N | -2.15 | 1,500.28 |
| 12/27 | Point Of Sale Withdrawal GALLON | -55.45 | 1,444.83 |

CANCEL    Page 4 of 6    SAVE

FIG. 4

Beginning balance on May 17, 2014          $4,984.64
Deposits and other additions                2,392.00
Withdrawals and other subtractions         -2,240.69
Checks                                         -0.00
Service fees                                   -1.69
Ending balance on june 17, 2014          $5,134.26

Your account has overdraft protection provided by deposit account number we're changing the name of MyAccess Checking to Bank of America Core Checking™.

A new name and that's all. Bank of America Core Checking is the same as MyAccess Checking. The benefits and features, account numbers, debit cards, and checks will not change. If you have questions about the new name, please call us at the number listed on this statement.

Deposits and other additions

| Date | Description | | Amount |
|---|---|---|---|
| 05/20/14 | Bkofamerica Atm 05/20 Deposit Penn Station | New York Ny | 298.00 |
| 05/30/14 | Bkofamerica Atm 05/20 Deposit Glen Cove | Glen Cove Ny | 2,04600 |
| 06/03/14 | Checkcard 0530 Shopmelie Pico Rivera Ca | | 48.00 |
| Total deposits and other additions | | | $2,392.00 |

[PREV] 06/03/2014  48.00  Checkcard 0530 Shopmelie Pico Rivera Ca  [NOT TXN]  [NEW TXN]  Page 3 of 14 |  [NEXT]

FIG. 5

| | | | | |
|---|---|---|---|---|
| 02/17 | Card Purchase 9638 | 02/12 Seven Brothers Gourm E Noprthport NY card | -97.88 | 717.29 |
| 02/23 | Cbp Transfer From Money Market 5401 | | 1,000.00 | 1,717.29 |
| 02/23 | Long Island | Cable Pmnt   PPD ID: | -83.31 | 1,633.98 |
| 02/23 | Check | # 953 | -81.56 | 1,552.42 |
| 02/23 | Check | # 952 | -37.00 | 1,515.42 |
| 02/24 | Card Purchase 9638 | 02/22 Handsome Rewards A Card | -51.90 | 1,463.52 |
| 02/26 | State Ins Fund  Wrkrs Comp   PPD ID: | | 160.00 | 1,623.52 ⟵ 601 |
| 02/26 | Card Purchase 9638 | 02/24 Daily News Circul01 800-6926397 NJ Card | -6.25 | 1,617.27 ⟵ 602 |
| 02/27 | Card Purchase | 02/25 Starcrest of Califor 951-9432026 CA Card 9638 | -40.00 | 1,577.27 |
| 03/02 | Building Sv 32Bj Payments   PPD ID: | | 88.00 | 1,665.27 |
| 03/02 | Card Purchase 9638 | 03/01 Josephines Shopping 631-7366181 NY Card | -161.61 | 1,503.66 |
| 03/02 | Mediblue Hmo  Blue Cross   PPD ID: | | -81.00 | 1,422.66 |
| 03/02 | Verizon | Paymentrec   PPD ID: | -27.51 | 1,395.15 |
| 03/04 | Check | # 822 | -1,150.00 | 245.15 |
| 03/04 | Card Purchase | 03/03 Blair *Blair 800-4586057 PA Card | -43.96 | 201.19 |
| 03/05 | Service Fee | | -12.00 | 189.19 |
| Ending Balance | | | | $189.19 |

Did you know you can waive your monthly service fee by keeping at least $1,500 in your Chase Better Banking Checking account or a combined average balance of $5,000 in qualifying checking, savings, credit, securities and mortgage loan accounts? During the statement period your minimum Chase Better Banking Checking balance was $147 and your combined average balance was $3,553.00

PREV  02/26/2009  -6.25   Card Purchase 02/24 Daily News Ciecul01   NOT TXN   NEW TXN   Page 20 of 94 |   NEXT 600
603

FIG. 6

| | | | |
|---|---|---|---|
| 02/17 | Card Purchase 02/12 Seven Brothers Gourm E Northport NY Card | -97.88 | 717.29 |
| 02/23 | Cbp Transfer From Money Market 5401 | 1,000.00 | 1,717.29 |
| 02/23 | Long Island Cable Pmnt PPD ID: | -83.31 | 1,633.98 |
| 02/23 | Check #953 | -81.56 | 1,552.42 |
| 02/23 | Check #952 | -37.00 | 1,515.42 |
| 02/24 | Card Purchase 02/22 Handsome Rewards A Card 9638 | -51.90 | 1,463.52 |
| 02/26 | State Ins Fund Wrkrs Comp PPD ID: | 160.00 | 1,623.52 ← 701 |
| 02/26 | Card Purchase 02/24 Daily News Circul01 800-6926397 NJ Card | -6.25 | 1,617.27 ← 702 |
| 02/27 | Card Purchase 02/25 Starcrest of Califor 951-9432026 CA Card | -40.00 | 1,577.27 |
| 03/02 | Building Sv 32Bj Payments PPD ID: | 88.00 | 1,665.27 |
| 03/02 | Card Purchase 03/01 Josephines Shopping 631-7366181 NY Card | -161.61 | 1,503.66 |
| 03/02 | Mediblue Hmo Blue Cross PPD ID: | -81.00 | 1,422.66 |
| 03/02 | Verizon Paymentrec PPD ID: | -27.51 | 1,395.15 |
| 03/04 | Check #822 | -1,150.00 | 245.15 |
| 03/04 | Card Purchase 03/03 Blair *Blair 800-4586057 PA Card | -43.96 | 201.19 |
| 03/05 | Service Fee | -12.00 | 189.19 |
| | Ending Balance | | $189.19 |

Did you know you can waive your monthly service fee by keeping at least $1,500 in your Chase Better Banking Checking account or a combined average balance of $5,000 in qualifying checking, savings, credit, securities and mortgage loan accounts? During the statement period your minimum chase Better Banking Checking balance was $147 and your combined average balance was $3,553.00

| CANCEL | Add the Transaction values | 02/26/2009 | 160.00 | State Ins Fund Wrkrs Comp | | CONFIRM | ← 703 |

FIG. 7

| | | | |
|---|---|---|---|
| 02/17 | Card Purchase 02/12 Seven Brothers Gourm E Northport NY Card | -97.88 | 717.29 |
| 02/23 | Cbp Transfer From Money Market 5401 | 1,000.00 | 1,717.29 |
| 02/23 | Long Island Cable Pmnt PPD ID: | -83.31 | 1,633.98 |
| 02/23 | Check #953 | -81.56 | 1,552.42 |
| 02/23 | Check #952 | -37.00 | 1,515.42 |
| 02/24 | Card Purchase 02/22 Handsome Rewards CA Card | -51.90 | 1,463.52 |
| 02/26 | State Ins Fund Wrkrs Comp PPD ID: | 160.00 | 1,623.52 |
| 02/26 | Card Purchase 02/24 Daily News Circul01 800-6926397 NJ Card | -6.25 | 1,617.27 |
| 02/27 | Card Purchase 02/25 Starcrest of Califo CA Card | -40.00 | 1,577.27 |
| 03/02 | Building Sv 32Bj Payments PPD ID: | 88.00 | 1,665.27 |
| 03/02 | Card Purchase 03/01 Josephines Shopping 631-7366181 NY Card | -161.61 | 1,503.66 |
| 03/02 | Mediblue Hmo Blue Cross PPD ID: | -81.00 | 1,422.66 |
| 03/02 | Verizon Paymentrec PPD ID: | -27.51 | 1,395.15 |
| 03/04 | Check #822 | -1,150.00 | 245.15 |
| 03/04 | Card Purchase 03/03 Blair *Blair 800-4586057 PA Card | -43.96 | 201.19 |
| 03/05 | Service Fee | -12.00 | 189.19 |
| | Ending Balance | | $189.19 |

Did you know you can waive your monthly service fee by keeping at least $1,500 in your Chase Better Banking Checking account or a combined average balance of $5,000 in qualifying checking, savings, credit, securities and mortgage loan accounts? During the statement period your minimum Chase Better Banking Checking balance was $147 and your combined average balance was $3,553.00.

| PREV | NEW TXN | Page 20 of 94 | NEXT |

FIG. 8

See both front and back images of cleared checks at Chase.com. If you're not enrolled in this free service, please enroll now.

```
                                                                    6402
                                              Date  9/1/2009
PAY
TO THE
ORDER OF   Sericho Water                         $ 9.00
 Nine                                    Dollars
       CHASE O
FOR    ******************
 *006*          141040343865     0000000400/
       12345678909876543210123456      $9.00
```

```
                                                                    6404
                                              Date  9/8/2009
PAY
TO THE
ORDER OF   R****** Village Justice Cout         $ 20.00
 Twenty                                  Dollars
       CHASE O
FOR    ******************
 *004404*       41060343665      000000 2000/
       12345678909876543210123456      $20.00
```

```
                                                                    6405
                                              Date  8/21/2009
PAY
TO THE
ORDER OF   Discover                             $ 1500.00
 One Thousand Five Hundred               Dollars
       CHASE O
FOR    ******************
 *00640*        141060341865     0000 150000/
       12345678909876543210123456      $1,500.00
```

```
                                                                    6408
                                              Date  8/31/2009
PAY
TO THE
ORDER OF   Internal Med. of East Hills          $ 5.70
 Five 70/100                             Dollars
       CHASE O
FOR    ******************
 *004408*       41040343865      0000000570/
       12345678909876543210123456      $5.70
```

900  
901

| PREV | 09/09/2009 | -5.70 | 12345678909876543210123456 | NOT TXN | NEW TXN | Page: 13 of 14 | NEXT |

Transaction Analysis ▾

| All Transactions | ★ Noteworthy Sheet | | | | | Request Statement Verification |
|---|---|---|---|---|---|---|
| 🔧 Detected Transfers | | | | | | |
| 🔧 Recurring Transactions | | | | Transaction Grade | | |
| Filter Accounts | | | Min. Amount $ to $ Max. Amount | | | |
| | | | mm/dd/yyy 📅 to 📅 mm/dd/yyy | | | |
| 50 ▾ Showing All Accounts. | | | Search 🔍 | 📁 XLSX CSV | | |

| ★ | 🔗 | Account ⬍ | Date ▾ | Description ⬍ | Debit ⬍ | Credit ⬍ | Grade ⬍ | Explanation ⬍ |
|---|---|---|---|---|---|---|---|---|
| ☆ | ☐ | TD Bank | 06/25/2014 | ATM TRFR IN. W", AUT SAV -<br>DDA 46 SCHOOL ST GLEN COVE ' NY | | 100.00 | | 📝 |
| ☆ | ☐ | TD Bank | 06/25/2014 | PAPER STATEMENT FEE | 1.00 | | ✓+ | 📝 |
| ☆ | ☐ | TD Bank | 06/25/2014 | DEBIT CARD PURCHASE, ****<br>VISA DDA PUR STEAMPOWERED COM 425 8899642 * WA | 3.98 | | ✓+ | 📝 |
| ☆ | ☐ | TD Bank | 06/25/2014 | DEBIT CARD PURCHASE, ****<br>VISA DDA PUR STARBUCKS 00832 GLEN CO GLEN COVE * NY | 4.69 | | ✓+ | 📝 |
| ☆ | ☐ | TD Bank | 06/25/2014 | DEBIT CARD PURCHASE, ****<br>VISA DDA PUR STEAMPOWERED COM 425 8899642 * WA | 4.99 | | ✓+ | 📝 |
| ☆ | ☐ | TD Bank | 06/25/2014 | DEBIT CARD PURCHASE, ****<br>VISA DDA PUR STARBUCKS 00832 GLEN CO GLEN COVE * NY | 3.86 | | ✓+ | 📝 |
| ☆ | ☐ | TD Bank | 06/25/2014 | DEBIT CARD PURCHASE, ****<br>VISA DDA PUR STEAMPOWERED COM WA | 14.97 | | ✓+ | 📝 |

| ★ | | Account | Date | Description | Debit | Credit | Grade | Explanation |
|---|---|---------|------|-------------|-------|--------|-------|-------------|
| ★ | | Citibank | 01/09/2014 | DEPOSIT 50 AVE w. NY. NY | | 8,915.80 | ✓+ | 📂 |
| ☆ | | Citibank | 01/09/2014 | DEPOSIT 50 AVE w. NY. NY | | 341.46 | ✓+ | 📂 |
| ☆ | | Chase | 12/06/2010 | Deposit 6 | | 1,000.00 | ✓+ | 📂 |
| ☆ | | Chase | 11/05/2010 | Deposit 8 | | 1,000.00 | ✓+ | 📂 |
| ☆ | | Chase | 09/07/2010 | Deposit 5 | | 200.00 | | 📂 |
| ☆ | | Chase | 08/06/2010 | Deposit 7 | | 1,000.00 | ✓+ | 📂 |
| ☆ | | Chase | 08/02/2010 | Deposit 7 | | 1,000.00 | ✓+ | 📂 |
| ☆ | | Chase | 07/06/2010 | Deposit 6 | | 1,000.00 | ✓+ | 📂 |
| ☆ | | Chase | 06/03/2010 | Deposit 7 | | 1,500.00 | ✓+ | 📂 |
| ☆ | | Chase | 05/13/2010 | Deposit 3 | | 116.66 | ✓+ | 📂 |
| ☆ | | Chase | 05/11/2010 | Deposit 3 | | | | |

FIG. 12

Edit Transaction - Page 64 of 66  ✕

^An image of this check may be available for you to view on Chase.com.

TRANSACTION DETAIL

| DATE | DESCRIPTION | AMOUNT | BALANCE |
|---|---|---|---|
| | Beginning Balance | | $4,084.16 |
| 11/05 | Deposit | 1,000.00 | 5,084.16 |
| 11/05 | Card Purchase  11/03 DC* Josephines Shop 631-7366181 NY Card | -57.19 | 5,026.97 |
| 11/05 | Check #1054  Cablevision Lbarccheck  Arc ID  1201 | -118.43 | 4,908.54 |
| 11/15 | 11/15 Withdrawal | -1,500.00 | 3,408.54 |
| 11/15 | Check  #1045 | -35.70 | 3,372.84 |
| 11/17 | Card Purchase With Pin 11/17 Town Drugs East Northpor NY Card 9638 | -189.00 | 3,183.84 |
| 11/18 | State Ins Fund  Wrkrs Comp  PPD ID | 160.00 | 3,343.84 |
| 11/19 | Card Purchase  11/17 DC* Josephines Shop 631-7366181 NY Card  9638 | -82.00 | 3,261.84 |

Date
11/15/2010

Amount
$-1,500.00

Description
11/15 Withdrawal

Explanation

[Delete Transaction]                    [Close] [Save and Verify]

FIG. 13

| | Account | Date | | Credit | Grade | Explanation |
|---|---|---|---|---|---|---|
| ★ | Citibank | 01/09/2014 | DEPOSIT 50 AVE w. NY, NY | 8,915.80 | ✓/+ | 📄 |
| ☆ | Citibank | 01/09/2014 | DEPOSIT 50 AVE w. NY, NY | 341.46 | ✓/+ | 📄 |
| ☆ | Chase | 12/06/2010 | Deposit 623740003 | 1,000.00 | ✓/+ | 📄 |
| ☆ | Chase | 11/05/2010 | Deposit 804708250 | 1,000.00 | ✓/+ | 📄 |
| ☆ | Chase | 09/07/2010 | Deposit 576827765 | 1,000.00 | ✓/+ | 📄 |
| ☆ | Chase | 08/06/2010 | Deposit 750889141% | 200.00 | ✓/+ | 📄 |
| ☆ | Chase | 08/02/2010 | Deposit 739924790 | 1,000.00 | ✓/+ | 📄 |
| ☆ | Chase | 07/06/2010 | Deposit 679936848 | 1,000.00 | ✓/+ | 📄 |
| ☆ | Chase | 06/03/2010 | Deposit 723193437 | 1,000.00 | ✓/+ | 📄 |
| ☆ | Chase | 05/13/2010 | Deposit 368336848 | 1,500.00 | ✓/+ | 📄 |
| ☆ | Chase | 05/11/2010 | Deposit ********** | 116.66 | ✓/+ | 📄 |

Filter Accounts
☐ Citibank: #12345
☐ TD Bank: #54321
☐ Chase: #12121

[Close]

Transaction Analysis

ACFE
Cases  ACFE  Transactions

All Transactions | ★ Noteworthy Sheet

- Detected Transfers — 1401
- Recurring Transactions — 1402
- Filter Accounts

Request Statement Verification

Transaction Grade
| $ Min. Amount | to | $ Max. Amount |
| mm/dd/yyyy | to | mm/dd/yyyy |

Showing All Accounts.  Search 🔍   XLSX  CSV

| ★ | Account | Date | Description | Debit | Credit | Grade | Explanation |
|---|---------|------|-------------|-------|--------|-------|-------------|
|   |         |      | Probable Transfers — 1406 |   |   |   |   |
| ☆ | Chase | 12/14/2009 | Telephone Transfer To Chk Xxxxxx5465 | 3,500.00 |  | ✓+ | 📄 |
| ☆ | Chase | 08/06/2010 | ATM Withdrawal 08/06 54 Main St Northport NY Card 9638g. | 200.00 |  | ✓+ | 📄 |
| ☆ | Chase | 04/30/2010 | ODP Transfer To Checking | 169.84 |  | ✓+ | 📄 |
| ☆ | Chase | 06/16/2010 | I Card Purchase 06/15 Withw21 New York NY Card 9638. | 160.00 |  | ✓+ | 📄 |
| ☆ | Chase | 12/07/2009 | ODP Transfer To Checking | 150.00 |  | ✓+ | 📄 |
| ☆ | Chase | 02/01/2010 | ODP Transfer To Checking — 1404 | 100.00 |  | ✓+ | 📄 |
| ☆ | Chase | 12/09/2009 | ODP Transfer To Checking | 50.00 |  | ✓+ | 📄 |
|   |         |      | Identified Transfers |   |   |   |   |
| ☆ | TDBank | 05/29/2014 | ATM TRFR IN, W45C64350913, AUTO52914XFER SAV-DDA 46 SCHOOL ST GLEN COVE* NY — 1405 |  | 40.00 | ✓+ | 📄 |
| ☆ | Chase | 12/09/2009 | ODP Transfer From Savings |  | 50.00 | ✓+ | 📄 |
| ☆ | TDBank | 06/20/2014 | ATM TRFR IN 062014XFER SAV-DDA 200HOFSTRA UNIVERSITY HEMPSTEAD* NY |  | 80.00 | ✓+ | 📄 |
| ☆ | Chase | 02/01/2014 | ODP Transfer From Savings |  | 100.00 | ✓+ | 📄 |
| ☆ | TDBank | 05/27/2014 | ATM TRFR IN, *****14 XFER SAV-DDA46 SCHOOL ST GLEN COVE* NY |  | 100.00 | ✓+ | 📄 |

FIG. 14

Transaction Analysis ▼

| All Transactions | ★ Noteworthy Sheet | | Request Statement Verification |
|---|---|---|---|
| 🔗 Detected Transfers | | Transaction Grade | |
| 🔗 Recurring Transactions | | $ Min. Amount  to  $ Max. Amount | |
| Filter Accounts | | 📅 mm/dd/yyyy  to  📅 mm/dd/yyyy | |
| 50 ▼ Showing All Accounts. | Search 🔍 | 📱 | XLSX   CSV |

| ★ 🔗 | ☐ | Account ⇅ | Date ⇅ | Description | Debit ⇅ | Credit ⇅ | Grade ⇅ | Explanation ⇅ |
|---|---|---|---|---|---|---|---|---|
| ☆ | ☐ | Chase # | 12/14/2009 | Telephone Transfer To Chk Xxxxxx5465 | 3,500.00 | | ✓+ | 📄 |
| ☆ | ☐ | ~~Citibank~~ | ~~01/13/2014~~ | ACH DEBIT AMERICAN EXPRE ACH PMT W9472 Jan 13 | 2,895.28 | | ✓+ | 📄 |
| ☆ | ☐ | | | /06 Withdrawal E ——1501 | 2,000.00 | | ✓+ | 📄 |
| | | | | CHECK NO: 1339 ——1502 | | | | |
| | | ┌─────────────────┐ | | | | | | |
| | | │ Find Recurrences │ | | | | | | |
| | | │ Find Transfer Matches │ | | | | | | |
| | | └─────────────────┘ | | | | | | |
| ☆ | ☐ | Chase # | 03/12/2010 | National Grid-Li Directpay PPD ID: | 1,609.54 | | ✓+ | 📄 |
| ☆ | ☐ | Chase # | 01/05/2010 | Withdrawal. | 1,500.00 | | ? | 📄 |
| ☆ | ☐ | Chase # | 11/15/2010 | 006780389225 #0000000000 | 1,500.00 | | ✓+ | 📄 |
| ☆ | ☐ | Chase # | 11/15/2010 | 11/15 Withdrawal | 1,250.00 | | ✓+ | 📄 |
| ☆ | ☐ | Chase # | 12/18/2009 | Check # 988 | | | | |
| ☆ | ☐ | Chase # | 01/07/2010 | Check # 990 | 1,150.00 | | ✓+ | 📄 |

| | | | | | | |
|---|---|---|---|---|---|---|
| ☆ | ☐ | Chase # | 12/14/2009 | Service Fee Reversal | | 12.00 | ✓+ | 🗂 |
| ☆ | ☐ | Chase # | 12/14/2009 | Deposit 1 | | 1,000.00 | ✓+ | 🗂 |
| ☆ | ☐ | Chase # | 12/14/2009 | Telephone Transfer From Sav Xxxxxx54010 | | 3,500.00 | ✓+ | 🗂 |
| ☆ | ☐ | Chase # | 12/15/2009 | Check # 987 | 167.66 | | ✓+ | 🗂 |
| ☆ | ☐ | Chase # | 12/17/2009 | State Ins Fund errs Comp PPD ID: | 1,250.00 | 160.00 | ✓+ | 🗂 |
| ☆ | ☐ | Chase # | 12/18/2009 | Check # 988 | 185.00 | | ✓+ | 🗂 |
| ☆ | ☐ | Chase # | 12/18/2009 | Check # 989 4 | 9.99 | | ? | 🗂 |
| ☆ | ☐ | Chase # | 12/21/2009 | Card Purchase 12/17 Hab | 37.00 | | ✓+ | 🗂 |
| ☆ | ☐ | Chase # | 12/21/2009 | Card Purchase 12/18 Haband 800-2131220 N | 19.99 | | ✓+ | 🗂 |
| ☆ | ☐ | Chase # | 12/22/2009 | Long Island Cable Pmnt PPD ID: | 189.86 | | ✓+ | 🗂 |
| ☆ | ☐ | Chase # | 12/24/2009 | Lipa Directpay PPD ID: | 75.00 | | ✓+ | 🗂 |
| ☆ | ☐ | Chase # | 12/31/2009 | State Ins Fund err Comp PPD ID: 1702 | | 160.00 | ✓+ | 🗂 |
| ☆ | ☐ | Chase # | 01/04/2010 | Treasury 303 Soc Sec PPD ID: | | 1,547.00 | ✓+ | 🗂 |
| ☆ | ☐ | Chase # | 01/04/2010 | Mediblue Hmo Blue Cross PPD ID: | 63.00 | | ✓+ | 🗂 |
| ☆ | ☐ | Chase # | 01/04/2010 | Building Sv 32B] Payments PPD ID: | | 88.00 | ✓+ | 🗂 |
| ☆ | ☐ | Chase # | 01/05/2010 | Withdrawal. | 1,500.00 | | ✓+ | 🗂 |
| ☆ | ☐ | Chase # | 01/07/2010 | Check # 990 | 1,150.00 | | ✓+ | 🗂 |

Find Recurrences
Find Transfer Matches

FIG. 18

| ★ | 🔖 | Account | Date | Description | | Debit | Credit | Grade | Explanation |
|---|---|---|---|---|---|---|---|---|---|
| ☆ | ☐ | Chase # | 10/01/2010 | US Treasury 303 Soc Sec PPD ID: | | | 1,547.00 | ✓+ | 📎 |
| ☆ | ☐ | Chase # | 07/02/2010 | US Treasury 303 Soc Sec PPD ID: | | | 1,547.00 | ✓+ | 📎 |
| ☆ | ☐ | Chase # | 04/02/2010 | US Treasury 303 Soc Sec PPD ID: | | | 1,547.00 | ✓+ | 📎 |
| ☆ | ☐ | Chase # | 05/03/2010 | US Treasury 303 Soc Sec PPD ID: | | | 1,547.00 | ? | 📎 |
| ☆ | ☐ | Chase # | 02/03/2010 | US Treasury 303 Soc Sec PPD ID: | | | 1,547.00 | ✓+ | 📎 |
| ☆ | ☐ | Chase # | 06/03/2010 | US Treasury 303 Soc Sec PPD ID: | | | 1,547.00 | ✓+ | 📎 |
| ☆ | ☐ | Chase # | 09/03/2010 | US Treasury 303 Soc Sec PPD ID: | | | 1,547.00 | ✓+ | 📎 |
| ☆ | ☐ | Chase # | 11/03/2010 | US Treasury 303 Soc Sec PPD ID: | | | 1,547.00 | ✓+ | 📎 |
| ☆ | ☐ | Chase # | 12/03/2010 | US Treasury 303 Soc Sec PPD ID: | | | 1,547.00 | ✓+ | 📎 |
| ☆ | ☐ | Chase # | 03/03/2010 | US Treasury 303 Soc Sec PPD ID: | | | 1,547.00 | ✓+ | 📎 |
| ☆ | ☐ | Chase # | 12/31/2009 | State Ins Fund errs Comp PPD ID: | | | 160.00 | ✓+ | 📎 |
| ☆ | ☐ | Chase # | 01/28/2010 | State Ins Fund errs Comp PPD ID: | | | 160.00 | ✓+ | 📎 |
| ☆ | ☐ | Chase # | 12/02/2010 | State Ins Fund errs Comp PPD ID: | | | 160.00 | ✓+ | 📎 |
| ☆ | ☐ | Chase # | 06/03/2010 | State Ins Fund errs Comp PPD ID: | | | 160.00 | ✓+ | 📎 |
| ☆ | ☐ | Chase # | 03/25/2010 | State Ins Fund errs Comp PPD ID: | | 1,609.54 | | | 📎 |
| ☆ | ☐ | Chase # | 11/04/2010 | National Grid-Li Directpay PPD ID: | | | | | 📎 |
| ☆ | ☐ | Chase # | 03/12/2010 | | | | | | |

FIG. 19

≡ Transaction Analysis ▼

[Search] 🔍 📄  XLSX  CSV

| ★ | ⚙ | Account ⇅ | Date ⇅ | Description | Debit ⇅ | Credit ⇅ | Grade ⇅ | Explanation ⇅ | |
|---|---|---|---|---|---|---|---|---|---|
| ☆ | ☐ | Chase # | 12/14/2009 | Telephone Transfer To Chk Xxxxx | 3,500.00 | | ✓+ | Transfer #1 - | 📄 |
| ☆ | ☐ | Chase # | 12/14/2009 | Telephone Transfer From Sav Xxx | | 3,500.00 | ✓+ | Transfer #1 - | 📄 |
| ☆ | ☐ | Chase # | 04/30/2010 | ODP Transfer from Savings 0000 | | 169.84 | ✓+ | Transfer #2 - | 📄 |
| ☆ | ☐ | Chase # | 04/30/2010 | ODP Transfer To Checking 00003 | 169.84 | | ✓+ | Transfer #2 - | 📄 |
| ☆ | ☐ | Chase # | 12/03/2010 | US Treasury 303 Soc Sec PPD ID: | | 1,547.00 | ✓+ | Social Security - | 📄 |
| ☆ | ☐ | Chase # | 11/03/2010 | US Treasury 303 Soc Sec PPD ID: | | 1,547.00 | ✓+ | Social Security - | 📄 |
| ☆ | ☐ | Chase # | 10/01/2010 | US Treasury 303 Soc Sec PPD ID: | | 1,547.00 | ✓+ | Social Security - | 📄 |
| ☆ | ☐ | Chase # | 09/03/2010 | US Treasury 303 Soc Sec PPD ID: | | 1,547.00 | ✓+ | Social Security - | 📄 |
| ☆ | ☐ | Chase # | 05/03/2010 | US Treasury 303 Soc Sec PPD ID: | | 1,547.00 | ? | Social Security - | 📄 |
| ☆ | ☐ | Chase # | 07/02/2010 | US Treasury 303 Soc Sec PPD ID: | | 1,547.00 | ✓+ | Social Security - | 📄 |
| ☆ | ☐ | Chase # | 06/03/2010 | US Treasury 303 Soc Sec PPD ID: | | 1,547.00 | ✓+ | Social Security - | 📄 |
| ☆ | ☐ | Chase # | 04/02/2010 | US Treasury 303 Soc Sec PPD ID: | | 1,547.00 | ✓+ | Social Security - | 📄 |
| ☆ | ☐ | Chase # | 03/03/2010 | US Treasury 303 Soc Sec PPD ID: | | 1,547.00 | ✓+ | Social Security - | 📄 |
| ☆ | ☐ | Chase # | 02/03/2010 | US Treasury 303 Soc Sec PPD ID: | | 1,547.00 | ✓+ | Social Security - | 📄 |
| ☆ | ☐ | Chase # | 12/31/2009 | US Treasury 303 Soc Sec PPD ID: | | 1,547.00 | ✓+ | Social Security - | 📄 |
| ☆ | ☐ | Chase # | 08/06/2010 | ATM Withdrawal 08/06 54 Main St Northport NY Card 9638 g... | 200.00 | | ✓+ | | 📄 |

Primary account number:   August 18, 2012 - September 20, 2012   ■ Page 3 of 6   | WELLS FARGO

Transaction history (continued)   2301a

| Date | Check Number Description | Deposits/Additions | | |
|---|---|---|---|---|
| 9/13 | Online Transfer Ref #Ibe88B6RKY From Custom Management (Rm) 60 to Checking | 60.00 | | |
| 9/13 | Check Crd Purchase 09/12 Google *Simonicrea Google .Com Ch CA ?McC=5399 | 50.00 | 111.15 | |
| 9/17 | Check Crd Purchase 09/14 Google *Simonicrea Google .Com Ch CA ?McC=5399 | 50.00 | | |
| 9/17 | Debit Crd Purchase 09/14 2CO.Com*Astril 323-4194010 CY ?McC=7372 | 29.95 | | |
| 9/17 | Alstate in CO Ins Prem SEP 12 000000907175053 Kennedy | 32.42 | -1.22 | |
| 9/20 | Monthly Service Fee | 13.00 | -14.22 | |
| Ending balance on 9/20 | | | -14.22 | |

Totals         $170.25         $463.04

The Ending Daily Balance does not reflect any pending withdrawals or holds on deposited funds that may have been outstanding on your account when your transactions posted. If you had insufficient available funds when a transaction posted, fees may have been assessed.

Summary of Overdraft and Returned Item fee(s)

| | Total this statement period | Total year-to-date ↑ |
|---|---|---|
| Total Overdraft Fees | $0.00 | $35.00 |
| Total Returned Item Fees | $0.00 | $0.00 |

↑ Year-to-date total reflects fees assessed or reversed since first full statement period of current calender year.

Effective November 1, 2012, your daily purchase/point-of-sale (POS) limit for your debit card or ATM card (s) will be $2,500.

2301b

Txns
▼ Array [8]                                    ⎫
  ▼ 0: Object                                  ⎪
    description:                               ⎪
    "Online Transfer Ref #Ibe88B6Rky From Custom ⎪  2302a
    Management (Rm) 60 to Checking"            ⎪
    grade : 2                                  ⎪
    page_num: 2                                ⎪
    amount: 6000                               ⎪
    ▶ bbox: Array [4]                          ⎪
    date: "2014-09-13"                         ⎪
    hidden: false                              ⎭
  ▶ 1: object                                  ⎫
    description :                              ⎪
    "Check crd Purchase 09/12 Google           ⎪
    *Simonicrea Google.Com, CA 434256xxxxx2002 ⎪  2302b
    08225642209032B ?McC=5399"                 ⎪
    grade : 2                                  ⎪
    page_num: 2                                ⎪
    amount: 5000                               ⎪
    ▶ bbox: Array [4]                          ⎪
    date: "2014-09-13"                         ⎪
    hidden: false                              ⎪
  ▶ 2: object                                  ⎪
  ▶ 3: object                                  ⎭

FIG. 29

DIME
Since 1864
P.O.BOX 546 WILLIAMSBURGH STATION BROOKLYN, NY 11211

For Inquires Call: 1-800-321-3463
Website: www.dimewill.com 016
028850

Customer Statement                                          Pg 1 of 3

Account Number:
Statement Date:           Aug 01 thru Aug 31, 2009

Summary - All Accounts

| Type | Beginning Balance | Ending Balance |
|---|---|---|
| Prime Dime Rewards Checking 160 | $109,118.66 | $105,161.53 |

FIG. 30

Select Balance (required):

Beginning
- Beginning Balance $109,118.66

Ending
- Ending Balance $105,161.53

Identify transactions with sign logic and map to accounts v7.7
Click to show/hide instructions Section comment: Beginning balance is empty

Page Comment
Select an Option ▼

Rotate

ROY'S RESTAURANT MANAGEMENT LLC | Account # 6850 1647 3919 | September 1, 2016 to September 30, 2016

Withdrawals and other debits -continued

| Date | Description | Amount |
|---|---|---|
| 09/06/16 | CHECKCARD 0902 CELLAIRIS - STAMFO STAMFORD CT 24224436247105005393554 CKCD 4812 XXXXXXXXXXXX8302 XXXX XXXX 8302 | -53.16 |
| 09/06/16 | CHECKCARD 0903 PATEL BROTHERS NORWALK CT 24224436248101078826132 CKCD 5411 XXXXXXXXXXXX8302 XXXX XXXX 8302 | -142.10 |
| 09/06/16 | CHECKCARD 0904 BULLS HEAD DINER STAMFORD CT 24801976248400627219278 CKCD 5812 XXXXXXXXXXXX8302 XXXX XXXX 8302 | -21.43 |
| 09/06/16 | TARGET T-21 B 09/04 #000327692 PURCHASE TARGET T-21 Broa Stamford CT | -115.85 |
| 09/07/16 | CHECKCARD 0902 GODIVA 141 STAMFORD CT 24431066250859203757014 CKCD 5441 XXXXXXXXXXXX8302 XXXX XXXX 8302 | -12.76 |
| 09/07/16 | CHECKCARD 0906 A AND P CITGO STAMFORD CT 24610436250004049124503 CKCD 5542 XXXXXXXXXXXX8302 XXXX XXXX 8302 | -55.51 |
| 09/08/16 | PARTY CITY 225 09/08 #000928574 PURCHASE PARTY CITY 2255 S Stamford CT | -21.25 |
| 09/09/16 | USPS PO 087718 09/09 #000556180 PURCHASE USPS PO 08771809 STAMFORD CT | -10.25 |
| 09/12/16 | CHECKCARD 0910 SHOPRITE HPE STREET S1 STAMFORD CT 24692166255000292456484 CKCD 5812 XXXXXXXXXXXX8302 XXXX XXXX 8302 | -25.41 |
| 09/12/16 | CHECKCARD 0910 CRAB SHELL STAMFORD CT 24269796255500655801801 CKCD 5812 XXXXXXXXXXXX8302 XXXX XXXX 8302 | -73.34 |
| 09/12/16 | CHECKCARD 0911 A AND P CITGO STAMFORD CT 24610462550040367484347 CKCD 5542 XXXXXXXXXXXX8302 XXXX XXXX 8302 | -27.25 |

WorkFusion  WorkSpace  Dashboard  Tasks  Qualifications  Messages  My Teams

Help ▼    ****** ****  ◄ Return

☐ Automatically accept the next task

Send Feedback

Accounts:
UNASSIGNED
38501647319 Bank of America CHECKING

Transaction type:
⦿ + (plus)  ⦾ - (minus)
Account:
2850164/3919 Bank of America CHECKING
☐ Assign account to all below Transaction Date:
09/06/2016

Description:
CHECKCARD 0902 CELLAIRIS

Amount:
$53.16

SAVE

FIG. 36

WorkFusion  WorkSpace  Dashboard  Tasks  Qualifications  Messages  My Teams

☐ Automatically accept the next task  [Skip] [Accept]

[Send Feedback]

Verify dates and descriptions v4.1
Click to show/hide instructions

Image of transaction:

| 04/15/16 | GRUBHUB INC | CCD | DES:Apr Actvty ID:5276107 INDN:Roy's Restaurant Manag CO ID:1261328194 | 1,001.43 | 1 |

Date required  Description
| 04/15 | | GRUBHUB INC;DES:APR ACTVTY ID:5276107 INDNROY'S RESTAURANT MANAG COID:1261328194CCD |
☐ N/A      **** **********

Image of transaction:

| 04/20/16 | EAT24 LLC33621 | DES:EDI PYMNTS ID:PMT927136 INDN: TAWA INDIAN CUISINE CO ID:7201854266 CCD | 408.56 | 2 |

Date required  Description
| 04/20 | | EAT24LLC:33621 DES:EDI PYMNTS ID:PMT927136 INDN TAWA INDIAN CUISINE COID:7201854266 CCD |
☐ N/A      **** **********

Image of transaction:

| 04/14/16 | STRATEGIC | DES:SFSDEPOSIT ID:B548952 INDN: TAWA INDIAN CUISINE CO ID:3010855279 CCD | 784.26 | 3 |

Date required  Description
| 04/14 | | eat24 LLC33521 DES:EDIPYMNTS ID:PMT927136 INDN TAWA INDIAN CUISINE COID:7201854266 CCD |
☐ N/A      **** **********

Image of transaction:

| 04/19/16 | STRIPE | DES:TRANSFER ID:ChowNow ID05779 INDN:X CO ID: WFMSTRIPE1 CCD | 1,001.43 | 4 |

Date required  Description
| 04/19 | | STRIPE  DES:TRANSFER  ID:CHOWNOW ID05779 INDN:X    CO ID:WFMSTRIPE1CCD |
☐ N/A      **** **********

Verify begin/end balances v4
Click to show/hide instructions

Begin balance:
Beginning Balance  1,026.10
End Balance:
Ending Balance  1,018.50

Begin Balance
$1,026.10
End Balance
$1,018.50

Balances are readable?
⦿ Yes
○ No

Submit

Wrong account

![Citizens Bank logo] Citizens Bank

1-800-862-6200
Call Citizens" PhoneBank anytime for account information, current rates and answers to your questions.

Business Advisor
Account Statement

② OF 12

Beginning October 01, 2015
through October 31, 2015

Section comment:
Accounts
[UNASSIGNED ×]
[2232206177
Citizens Bank ×
CHECKING]
[Add]

Commercial Checking

ROBERT GARGANO INC
DBA GSS POWERSPORTS
Business Advisor Checking
223220-612-7

SUMMARY

Balance Calculation
Previous Balance       2,109.50
Checks                16,677.75  -
Debits                54,740.72  -
Deposits & Credits    75,705.75  +
Current Balance    6,396.78  =

You can waive the monthly maintenance fee of $25.00 by maintaining a monthly combined balance of $35,000 or an average daily balance in your checking account of $10,000.
Your monthly combined balance used to qualify this statement period is:   $11,643
Your average daily checking balance used to qualify this statement period is:   $2,232
Your next statement period will end on November 30, 2015.

TRANSACTION DETAILS
Checks * There is a break in check sequence

| Check # | Amount | Date | Check # | Amount | Date |
|---|---|---|---|---|---|
| | | | | Previous Balance | 2,109.50 |
| -5151 | 148.84 | 10/26 ⊗ [dup] | -33482 | 101.55 | 10/19 ⊗ [dup] |
| -5445 * | 167.20 | 10/13 ⊗ [dup] | -33483 | 62.64 | 10/19 ⊗ [dup] |
| -5446 | 155.48 | 10/19 ⊗ [dup] | -33484 | 509.65 | 10/19 ⊗ [dup] |

| | | | | | |
|---|---|---|---|---|---|
| -5447 | 242.88 | 10/21 ⊠ [dup] | -33485 | 700.00 | 10/15 ⊠ [dup] |
| -5449 * | 44.00 | 10/27 ⊠ [dup] | -33486 | 14.20 | 10/26 ⊠ [dup] |
| -5450 | 107.70 | 10/27 ⊠ [dup] | -33487 | 190.00 | 10/19 ⊠ [dup] |
| -8004 * | 26.00 | 10/19 ⊠ [dup] | -33488 | 59.75 | 10/20 ⊠ [dup] |
| -9004 * | 75.00 | 10/19 ⊠ [dup] | -33489 | 379.48 | 10/21 ⊠ [dup] |
| -33453 * | 886.78 | 10/02 ⊠ [dup] | -33490 | 185.69 | 10/22 ⊠ [dup] |
| -33455 * | 50.00 | 10/01 ⊠ [dup] | -33491 | 451.23 | 10/20 ⊠ [dup] |
| -33458 * | 1,382.03 | 10/05 ⊠ [dup] | -33492 | 740.00 | 10/19 ⊠ [dup] |
| -33459 | 151.12 | 10/06 ⊠ [dup] | -33493 | 64.56 | 10/20 ⊠ [dup] |
| -33460 | 90.37 | 10/02 ⊠ [dup] | -33494 | 884.71 | 10/23 ⊠ [dup] |
| -33461 | 116.80 | 10/15 ⊠ [dup] | -33495 | 72.64 | 10/27 ⊠ [dup] |
| -33462 | 18.89 | 10/07 ⊠ [dup] | -33496 | 65.00 | 10/30 ⊠ [dup] |
| -33463 | 191.27 | 10/08 ⊠ [dup] | -33499 * | 150.00 | 10/23 ⊠ [dup] |
| -33464 | 214.31 | 10/13 ⊠ [dup] | -33500 | 114.84 | 10/23 ⊠ [dup] |
| -33465 | 117.72 | 10/15 ⊠ [dup] | -33501 | 40.00 | 10/23 ⊠ [dup] |
| -33466 | 200.00 | 10/14 ⊠ [dup] | -33502 | 511.53 | 10/21 ⊠ [dup] |
| -33467 | 699.37 | 10/05 ⊠ [dup] | -33503 | 58.08 | 10/22 ⊠ [dup] |
| -33468 | 500.00 | 10/09 ⊠ [dup] | -33504 | 275.00 | 10/20 ⊠ [dup] |
| -33470 * | 500.00 | 10/23 ⊠ [dup] | -33505 | 150.00 | 10/30 ⊠ [dup] |
| -33473 * | 300.00 | 10/09 ⊠ [dup] | -33506 | 197.00 | 10/26 ⊠ [dup] |
| -33474 | 290.03 | 10/13 ⊠ [dup] | -33507 | 161.67 | 10/27 ⊠ [dup] |
| -33475 | 140.00 | 10/13 ⊠ [dup] | -33508 | 66.00 | 10/29 ⊠ [dup] |
| -33476 | 511.53 | 10/07 ⊠ [dup] | -33509 | 191.27 | 10/29 ⊠ [dup] |
| -33477 | 325.89 | 10/13 ⊠ [dup] | -33510 | 63.80 | 10/30 ⊠ [dup] |
| -33478 | 49.48 | 10/15 ⊠ [dup] | -33511 | 57.94 | 10/29 ⊠ [dup] |
| -33479 | 521.53 | 10/14 ⊠ [dup] | -33512 | 860.21 | 10/29 ⊠ [dup] |
| -33480 | 124.56 | 10/14 ⊠ [dup] | -33513 | 511.53 | 10/30 ⊠ [dup] |
| -33481 | 225.00 | 10/14 ⊠ [dup] | -33515 * | 223.00 | 10/28 ⊠ [dup] |

Total Checks  16,677.75

FIG. 38 (Cont.)

Citizens Bank 1-800-862-6200
Call Citizens* PhoneBank anytime for account information, Current rates and answers to your questions.

Business Advisor Account Statement

② OF 10

Beginning September 01, 2015 through September 30, 2015

ROBERT GARGAND INC
DBA GSS POWERSPORTS
Business Advisor Checking
223220-612-7

Section comment: |
Accounts

| UNASSIGNED | x |
| 2232206127 Citizens Bank CHECKING | x |
| 2232206127 Citizens Bank CREDIT CARD | x |

Add

Statement Period:
09/01/2015 - 09/30/2015 ▼
Begin Balance
n/a
End Balance
n/a
Begin Date
09/01/2015
End Date
09/30/2015
Account Number
2232206127
Bank
Other
Citizens Bank ▼
Type
CHECKING ▼

SAVE  Cancel

---

Commercial Checking
SUMMARY
Balance Calculation
Previous Balance         -1,180.58
Checks                   14,856.61 -
Debits                   60,357.34 -
Deposits & Credits       78,504.03 +
Current Balance       2,109.50 =

You can waive the monthly maintenance fee of $25.00 by maintaining a monthly combined balance of $35,000 or an average daily balance in your checking account of $10,000.
Your monthly combined balance used to qualify this statement period is:      $12,907
Your average daily checking balance used to qualify this statement period is: $3,438

Your next statement period will end on October 30, 2015.

Previous Balance        -1,180.58

TRANSACTION DETAILS
Checks  * There is a break in check sequence

| Check # | Amount | Date  |      | -Check # | Amount | Date  |       |
|---------|--------|-------|------|----------|--------|-------|-------|
| - 5441  | 76.00  | 09/18 | ✕ [dup] | 33435 | 132.65 | 09/17 | ✕ [dup] |
| - 5443* | 72.30  | 09/22 | ✕ [dup] | - 33436 | **.09 | 09/17 | ✕ [dup] |

FIG. 39

| | | | | | | |
|---|---|---|---|---|---|---|
| - 5444 | **.00 | | | - 33437 | **.00 | |
| - 8003* | **.00 | 09/30 XX [dup] | | - 33438 | **.00 | 09/14 XX [dup] |
| - 9003* | **.00 | 09/18 XX [dup] | | - 33439 | 265.00 | 09/15 XX [dup] |
| - 33415* | **.00 | 09/18 XX [dup] | | - 33440 | 212.84 | 09/14 XX [dup] |
| - 33419* | 252.18 | 09/02 XX [dup] | | - 33441 | 161.55 | 09/17 XX [dup] |
| - 33420 | **.53 | 09/01 XX [dup] | | 33442 | 64.10 | 09/18 XX [dup] |
| - 33421 | 223.00 | 09/02 XX [dup] | | - 33443 | 511.53 | 09/21 |
| - 33423* | 191.27 | 09/01 XX | | - 33444 | 342.98 | 09/16 XX [dup] |
| - 33424 | 422.86 | 09/02 XX [dup] | | - 33445 | 592.00 | 09/21 XX [dup] |
| - 33425 | 100.17 | 09/09 XX [dup] | | - 33446 | **.06 | 09/17 XX [dup] |
| - 33426 | 224.49 | 09/04 XX [dup] | | - 33447 | 150.00 | 09/17 XX [dup] |
| - 33427 | 290.03 | 09/09 XX [dup] | | - 33448 | 275.00 | 09/18 XX [dup] |
| - 33428 | 81.33 | 09/09 XX [dup] | | - 33449 | 223.00 | 09/21 |
| - 33429 | 106.52 | 09/08 XX [dup] | | - 33450 | 50.00 | 09/22 XX [dup] |
| - 33430 | 1,316.99 | 09/08 XX [dup] | | - 33451 | 511.53 | 09/24 XX [dup] |
| - 33431 | 511.53 | 09/10 XX [dup] | | - 33452 | 45.96 | 09/24 XX [dup] |
| - 33432 | 2,734.10 | 09/10 XX [dup] | | 33454* | 511.53 | 09/30 XX [dup] |
| - 33433 | 1,725.69 | 09/16 XX | | 33456* | 275.00 | 09/30 |
| - 33434 | 565.80 | 09/17 XX | | - 33457 | 228.00 | 09/29 XX [dup] |
| | | 09/17 XX [dup] | | | | 09/29 XX [dup] |

Total Checks 14,856.61

FIG. 39 (Cont.)

Citizens Bank 1-800-862-6200
Call Citizens* PhoneBank anytime for account information, Current rates and answers to your questions.

Business Advisor Account Statement

② OF 10

Beginning September 01, 2015 through September 30, 2015

ROBERT GARGAND INC
DBA GSS POWERSPORTS
Business Advisor Checking
223220-612-7

Section comment:
Accounts

| UNASSIGNED | x |
| 2232206127 Citizens Bank CHECKING | x |
| 2232206127 Citizens Bank CREDIT CARD | x |

Add

Transaction type: ○ + (plus) ● - (minus)
Account: 2232206127 Citizens Bank CREDIT CARD
Statement Period: 09/01/2015 - 09/30/2015 ▼
Transaction Date: 09/18/2015
Description: 9003*
Amount: $75.00

SAVE

Commercial Checking
SUMMARY
Balance Calculation
Previous Balance        -1,180.58
Checks                  14,856.61 -
Debits                  60,357.34 -
Deposits & Credits      78,504.03 +
Current Balance      2,109.50 =

You can waive the monthly maintenance fee of $25.00 by maintaining a monthly combined balance of $35,000 or an average daily balance in your checking account of $10,000.
Your monthly combined balance used to qualify this statement period is: $12,907
Your average daily checking balance used to qualify this statement period is: $3,438
Your next statement period will end on October 30, 2015.

Previous Balance       -1,180.58

TRANSACTION DETAILS
Checks* *There is a break in check sequence*

| Check # | Amount | Date | | | -Check # | Amount | Date | | |
|---|---|---|---|---|---|---|---|---|---|
| - 5441 | 76.00 | 09/18 | ⊗ | [dup] | 33435 | 132.65 | 09/17 | ⊗ | [dup] |
| - 5443* | 72.30 | 09/22 | ⊗ | [dup] | - 33436 | **.09 | 09/17 | ⊗ | [dup] |

FIG. 40

| Check # | Amount | Date | | Check # | Amount | Date | |
|---|---|---|---|---|---|---|---|
| 5444 | **.00 | 09/30 | [dup] | 33437 | **.00 | 09/14 | [dup] |
| 8003* | **.00 | 09/18 | [dup] | 33438 | **.00 | 09/15 | [dup] |
| 9003* | **.00 | 09/18 | [dup] | 33439 | 265.00 | 09/14 | [dup] |
| 33415* | **.00 | 09/02 | [dup] | 33440 | 212.84 | 09/17 | [dup] |
| 33419* | 252.18 | 09/01 | [dup] | 33441 | 161.55 | 09/18 | [dup] |
| 33420 | **.53 | 09/02 | [dup] | 33442 | 64.10 | 09/21 | |
| 33421 | 223.00 | 09/01 | | 33443 | 511.53 | 09/16 | [dup] |
| 33423* | 191.27 | 09/02 | | 33444 | 342.98 | 09/21 | [dup] |
| 33424 | 422.86 | 09/09 | [dup] | 33445 | 592.00 | 09/17 | [dup] |
| 33425 | 100.17 | 09/04 | [dup] | 33446 | **.06 | 09/17 | [dup] |
| 33426 | 224.49 | 09/09 | [dup] | 33447 | 150.00 | 09/18 | [dup] |
| 33427 | 290.03 | 09/09 | | 33448 | 275.00 | 09/21 | |
| 33428 | 81.33 | 09/08 | [dup] | 33449 | 223.00 | 09/22 | [dup] |
| 33429 | 106.52 | 09/08 | [dup] | 33450 | 50.00 | 09/24 | [dup] |
| 33430 | 1,316.99 | 09/10 | [dup] | 33451 | 511.53 | 09/24 | [dup] |
| 33431 | 511.53 | 09/10 | | 33452 | 45.96 | 09/30 | [dup] |
| 33432 | 2,734.10 | 09/16 | | 33454* | 511.53 | 09/30 | |
| 33433 | 1,725.69 | 09/17 | | 33456* | 275.00 | 09/29 | [dup] |
| 33434 | 565.80 | 09/17 | [dup] | 33457 | 228.00 | 09/29 | [dup] |

Total Checks 14,856.61

FIG. 40 (Cont.)

CUSTOMER SERVICE
If you have any questions regarding your account or discover an error, call the number shown on the front of your statement or write to us at the following address:

Citybanks Bank
Customer Service Center
P.O Box 42001
Providence, RI 02940-2001

Deposit Accounts Are Non- Transferable
Personal deposits accounts, such as CD's and savings accounts, cannot be transferred to another Person or to a corporate entity.

Loan Statements
BILLING RIGHTS SUMMARY
In Case of Errors or Questions about Your Bill
If you think your bill is wrong or if you need more Information about a transaction on your bill, write 1c us at the address shown above as soon as possible. We must hear from you no later than 60 days after we sent you the first bill on which the error or problem appeared. You can telephone us, but doing so will not preserve your rights.

In your letter, give us the following information:
- Your name and account number.
- The dollar amount of the suspected error.
- Describe the error and explain, if you can, why you believe there is an error,
  If you need more information, desseribe the item you are unsure about.

You do not have to pay any amount in question while we are investigating, but you are still obligated to pay the parts of your bit that are not in question. While we investigate your question, we cannot report you as delinquent or take any action to collect the amount you question
Special Rule for Credit Card Purchases
if you have a problem with the quality of goods or Services that you purchased with a credit card and you have tried in good faith to correct the problem with the merchant, you may not have to pay the remaining amount due on the goods and services. You have this protection only when the purchase price was more than $50 and the purchase was made in your home stable or with in 100 miles of your mailing address. ( If we own or operate the merchant, or if we mailed you the advertisement for the property or services. all purchases are covered regardless of amount or location of purchase.)
ELECTRONIC TRANSFERS
In Case of Errors or Questions About Your Electronic Transfers
( For Consumers Accounts Used Primarily for Personal, Family or Household Purposes )
Telephone us as the customer service number provided on Page 1 of this statement or write to us at the customer service address provided above as soon as you can, if you think your statement or receipt is wrong or if you need more information about an electronic transfer on the statement or receipt, We must hear from you no later than 60 days after we sent you the FIRST statement on which the error or problem appeared.

- Tell us your name and account number, if any
- Describe the error or the transfer you are unsure about, and explain as clearly as you can why you believe it is an error or why you need more information
- Tell us the dollar amount of the suspended error and, if possible the date if appeared on your statement or receipt.
- If will be helpful to us if you also give us a telephone number at which you can be reached in case we need any further information.

Accounts

UNASSIGNED ✕

2232206127 Citizens Bank CHECKING ✕

2232206127 Citizens Bank CREDIT CARD ✕

Add

Statement Period:

09/01/2015 - 09/30/2015 ▽

Begin Balance n/a

End Balance n/a

Begin date

09/01/2015

End Date

09/30/2015

Account Number

2232206127

Bank

Other ▽

Citizens Bank

Type

CHECKING ▽

SAVE  Cancel

FIG. 41 (Cont.)

For consumer accounts used primarily for personal, family or household purposes, we will investigate your compaint and will correct any error promptly, if we take more than 10 business days (20 business days if you are a new customer for electronic transfers occuring during the first 30 days after the first deposit is made to your account ) to do this, we will credit your account for the amount you think is in error. so that you will have the use of the money during the time it takes us to complete our investigation.

[For other accounts, we investigate, and if we find we have made an error, we credit your account at the conclusion of our investigation.]

FINANCE CHARGE CALCULATIONS FOR OVERDRAFT LINE OF CREDIT ACCOUNTS BASED ON AVERAGE DAILY BALANCE COMPUTATION METHOD

Calcluating your Finance Charge
We compute your finance charge by multiplying the Average Daily Balance of your account by the Daily Periodic date and then multiplying the result by the number of days in the billing cycle.

Calcluating your Average Daily Balance
To get the average daily balance, we take the beginning balance of your account each day (which does not include any unpaid finance charges or lines). add any new Overdraft Line at Credit transactions as of the date of those transactions, and subtract any payments or credits. This gives us the daily balance, Then we add all the daily balances for the billing cycle together and divide the total by the number of days in the billing cycle, This gives us the average daily balance of your account.

FIG. 41 (Cont.)

SYSTEMS AND METHODS FOR GENERATING ACCURATE TRANSACTION DATA AND MANIPULATION

CROSS REFERENCE TO RELATED APPLICATIONS

The present application claims the benefit of U.S. Provisional Application Ser. No. 62/288,627 filed 29 Jan. 2016; which is incorporated herein by reference in its entirety for all purposes.

SUMMARY

In general, the present disclosure is directed at producing highly accurate transaction histories for a series of transaction input over a network, and providing efficient verification and error correction. More specifically, the present system and methods disclosed are directed toward systems and methods for accurately inputting a series of financial transaction from a statement quickly, with a high degree of accuracy and a reduction in processing time and then compiling the data transactions for manipulation.

BACKGROUND

Many people and entities continue to receive bank records, credit card statements and other financial statements in traditional paper format or electronic images resembling traditional paper format. Whether receiving these transaction records in paper of Portable Document File (PDF) format reviewing, reconciling and organizing and quickly searching is difficult or impossible because transactions span across different statements, may be from different sources, and are impossible to manually reorganize or regroup in their original physical form.

If a user wanted to enter the data into a tabulated format, such as a spreadsheet, errors are easily introduced. Accordingly a need exists for a system and method that ensures near one-hundred percent accuracy in data input, allows for manipulation, filtering, grouping and searching.

SUMMARY

The current system and method allows users to scan and upload bank statements, credit card statements, investment statements, and any other tabulated series of repeated entries into a web based application for processing and to identify errors in the entries, sort search and filter the entries. The system and methods utilizing preprocessing techniques improve processing times, increases accuracy and reduces errors.

In one or more embodiments, the uploaded statement images are preprocessed and converted to text using Optical Character Recognition (OCR) to identify transactions and transaction types. The transactions are recognized, organized, extracted and tabulated into a database and then may be displayed on a display using a graphical user interface. In an embodiment, the processing occurs over a network. Conversion of uploaded documents can be done quickly and efficiently in a matter of minutes by employing multiple core processors operating in parallel in accordance with embodiments of the present disclosure.

In one or more embodiments, before the user begins searching and sorting through data strings and transactions in the database, transactional data are verified via an error correction procedure that ensures one-hundred percent accuracy. In an embodiment, the system and method utilize the extracted statement account balances to autonomously identify potential OCR conversion mistakes.

In one or more embodiments, if the system fails to read a transaction value correctly, the user is prompted to that failure via highlighting of the failure on the display. In another embodiment, highlighting may indicate that the data was read but that error correction detected some problem with the conversion. In an embodiment, potential reading errors are displayed on the GUI alongside or in conjunction with the original source data, thereby allowing the user to view the original and converted data simultaneously. In an embodiment, when a user revises a potential error, the remaining data entries, which might have been previously identified as potential errors are recomputed and reevaluated automatically based on the revision. Upon completion of the review, the system compiles a one-hundred percent accurate data store of transaction processing.

In one or more embodiments, the user interfacing with the system through a GUI, may sort, search and filter through the transactions data store to locate transactions of interest. In an embodiment, the searches may be based on date, dollar amount and description. In an embodiment, each transaction in the data store is linked back to the original location on the original document image. In an embodiment, when a transaction in the database is selected, a snapshot image of the appropriate page from the uploaded statement is displayed, with the corresponding transaction highlighted. Accordingly, a user can quickly contextualize the transaction to determine its significance to the audit.

In one or more embodiments, a user audits a transaction by receiving, over a communications network, a set of image based transactions, storing the set of image based transaction in a central data store, associating the set of image based transactions with a unique identifier associated with a user, identifying a transaction format from the set of image based transactions, utilizing a processor to apply a preprocessing to the set of image based transactions based on the identifying, processing the preprocessed image based transactions, via the processor, into a series of text based transactions, wherein each image based transaction has a related text based transaction and each text based transaction has a plurality of data representing the transaction, storing, the plurality of data for each text based transaction in a data store, associating a quality identifier with each text based transaction wherein the quality identifier is based on the probability that the text based transaction was processed correctly, applying an identifier to a text based transaction based on the quality identifier, and transmitting, over the network, to a display the text based transaction and the associated identifier.

In one or more embodiments, conversion of an image of a document to textual data is improved by using a microprocessor for preprocessing the document image, applying optical character recognition to the document image, using the microprocessor, to convert the document image into a set of textual data, identifying a first subset of data comprising one or more items from the set of textual data, using the microprocessor, based on a similarity between the one or more items to each other or to a predefined template, annotating the first subset of data, using the microprocessor, analyzing the annotated first subset of data to identify each of the one or more items as a unique transaction, associating a first unique transaction with a key identifier, analyzing at least one of the unique transactions other than the first unique transaction based on the key identifier to determine a correlation between the first unique transaction and the at least one of the unique transactions other than the first unique transaction, and determining, based on the correlation, whether the subset of data has been accurately converted to textual data.

In one or more embodiments, the preprocessing includes at least one of de-skewing, de-specking, binarization, line removal, layout analysis, zoning, line detection, word detection, character isolation, segmentation, applying a lexicon, near neighbor analysis, grammatical analysis, applying Benfords law, or any combinations thereof.

In one or more embodiments, the preprocessing identifies transactions and transaction types. In other embodiments, each unique transaction is at least one of recognized, identified, organized, extracted, or tabulated into a database. In further embodiments, the document is a bank statement or a credit card statement. In additional embodiments, the key identifier is at least one of a running balance, identified total, account number, or date range.

In one or more embodiments, the extracted bank statement or credit card statement account balances are used to autonomously identify potential OCR conversion errors. In other embodiments, potential errors are presented on a graphical user interface in conjunction with the original portion of the document image corresponding to the first subset of data for comparison purposes.

In one or more embodiments, the set of textual data is stored in a data store, wherein each unique transaction comprising the set of textual data in the data store is linked back to the original location on the document image. In other embodiments, questionable unique transactions are flagged. In further embodiments, the key identifier is used to identify and flag potential OCR conversion errors.

In one or more embodiments, textual data is edited to provide for accurate conversion. In other embodiments, upon editing of at least one portion of textual data identified as a potential error, the remaining portions of textual data, which may have been identified as potential errors are automatically reevaluated based on the edits.

In one or more embodiments, the annotating includes at least one of highlighting unique transactions verified as accurate, highlighting unique transactions identified as containing errors, or highlighting unique transactions verified as accurate and unique transactions identified as containing errors. In other embodiments, the unique transactions verified as accurate are highlighted in a first color and the unique transactions identified as containing errors are highlighted in a second color.

In one or more embodiments, the data store is searched for one or more unique transactions. In other embodiments, the graphical user interface includes a user created button for saving an advanced search parameter for searching the data store. In further embodiments, the graphical user interface includes a slider button to set a closeness value for a search parameter for searching the data store. In additional embodiments, the first unique transaction is set as an anchor transaction to use as basis for an advanced search. In yet other embodiments, a recurring transaction is identified using the anchor transaction as the basis for the search.

BRIEF DESCRIPTION OF THE DRAWINGS

FIG. 2 is an exemplary depiction of user analyze screen prompting a user to view and search through converted transactions in an embodiment of the present disclosure.

FIG. 3 is an exemplary depiction of a series of transactions in an embodiment of the present disclosure.

FIG. 4 is an exemplary depiction of a series of transactions in an embodiment indicating that some of the transactions were not converted to text from the original documents in an embodiment of the present disclosure.

FIG. 5 is an exemplary depiction of the verification mode in an embodiment of the present disclosure.

FIG. 6 is an exemplary depiction of a transaction that was not entered resulting in an omitted entry in an embodiment of the present disclosure.

FIG. 7 is an exemplary depiction of a newly added/previously omitted transaction being entered in an embodiment of the present disclosure.

FIG. 8 is an exemplary depiction of a revised transaction data store after a previously omitted transaction is entered in an embodiment of the present disclosure.

FIG. 9 is an exemplary depiction of the text beneath a check image being misidentified as a transaction in an embodiment of the present disclosure.

FIG. 10 is an exemplary depiction of the investigation modes screen after all the data verification has been completed in an embodiment of the present disclosure.

FIG. 11 is an exemplary depiction of a search screen for a search seeking all deposit transactions in an embodiment of the present disclosure.

FIG. 12 is an exemplary depiction of a "snapshot" image of a page from the original uploaded in an embodiment of the present disclosure.

FIG. 13 is an exemplary depiction of a search screen showing the ability to search data aggregated across different account in an embodiment of the present disclosure.

FIG. 14 is an exemplary depiction of a screen showing all transfers and all exact dollar amount transfers between accounts in an embodiment of the present disclosure.

FIG. 15 is an exemplary depiction of a screen showing the matching transaction feature in an embodiment of the present disclosure.

FIG. 16 is an exemplary depiction of a screen showing a parameter selection screen in an embodiment of the present disclosure.

FIG. 17 is an exemplary depiction of a screen showing an anchor transaction in an embodiment of the present disclosure.

Figure 18:
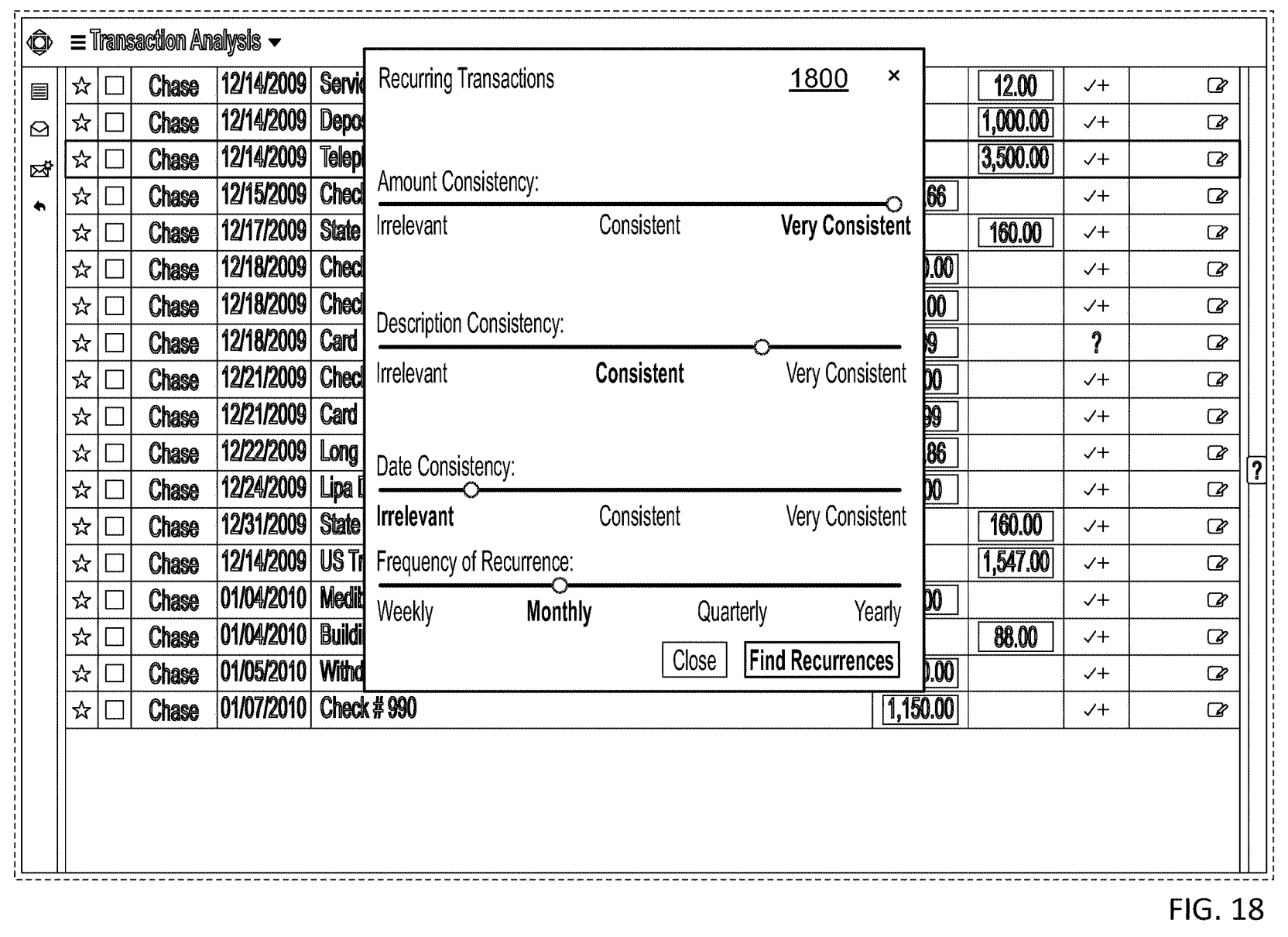

FIG. 18 is an exemplary depiction of screen showing a parameter selection screen in an embodiment of the present disclosure.

FIG. 19 is an exemplary depiction of a screen showing the results of a typical search in an embodiment of the present disclosure.

FIG. 20 is an exemplary depiction of a screen showing a saved search in an embodiment of the present disclosure.

FIG. 23 is an exemplary chart of a scanned document during the OCR process in accordance with an embodiment of the present disclosure.

FIG. 29 is an exemplary depiction of a "snapshot" image of a page from the original uploaded showing a highlighted portion according to an embodiment of the present disclosure.

FIG. 30 is an exemplary depiction of a "snapshot" image of a page from the original uploaded showing annotated portions according to an embodiment of the present disclosure.

FIG. 31 is an exemplary depiction of a "snapshot" image of a page from the original uploaded showing a data entry portion for correcting data according to an embodiment of the present disclosure.

FIG. 33 is an exemplary depiction of a "snapshot" image of a page from the original uploaded showing a highlighted portion and a data entry portion for correcting data according to an embodiment of the present disclosure.

FIG. 36 is an exemplary depiction of a "snapshot" image of a page from the original uploaded showing a data entry portion for correcting data according to an embodiment of the present disclosure.

FIG. 37 is an exemplary depiction of a "snapshot" image of a page from the original uploaded showing a data entry portion for correcting data according to an embodiment of the present disclosure.

FIG. 38 is an exemplary depiction of a "snapshot" image of a page from the original uploaded showing a highlighted portion for reconciliation of data according to an embodiment of the present disclosure.

FIG. 39 is an exemplary depiction of a "snapshot" image of a page from the original uploaded showing a highlighted portion for reconciliation of data according to an embodiment of the present disclosure.

FIG. 40 is an exemplary depiction of a "snapshot" image of a page from the original uploaded showing a highlighted portion for reconciliation of data according to an embodiment of the present disclosure.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

The current system uploads documents in scanned or electronic formats for searching, processing, and sorting in an error free environment. In an embodiment, the uploaded documents were financial documents, such as bank statements, investment account statements, credit card statements or any other type of statement reflecting a series of repeated or repeating transactions.

The documents may be uploaded over a network. The network may be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points, through which a user may connect to the network in order to receive and process data.

Figure 1:
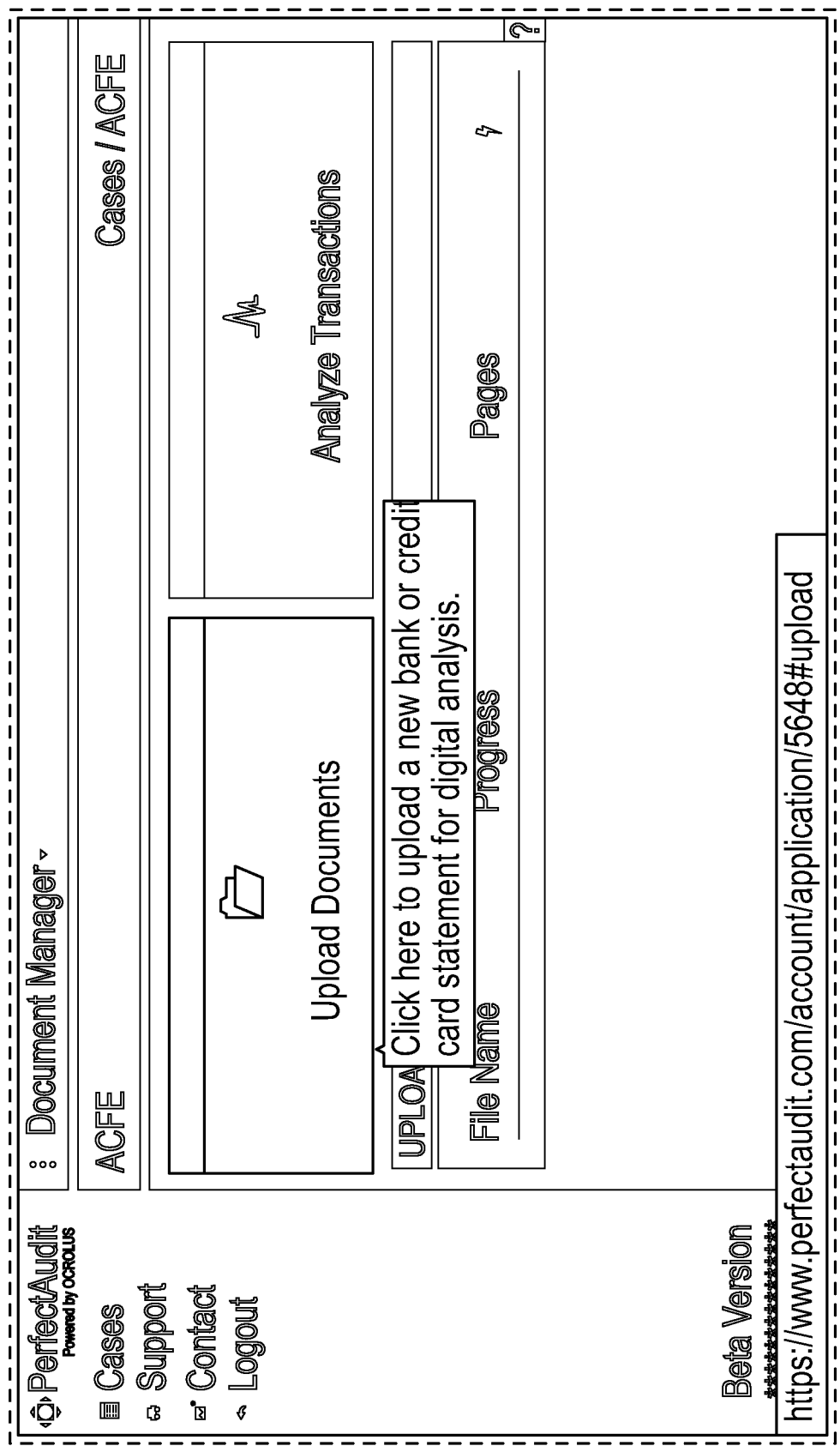
FIG. 1 is an exemplary depiction of the user upload screen prompting a user to upload scanned or electronic statements in an embodiment of the present disclosure.

FIG. 1 depicts a data entry screen prompting the user to upload documents over a network. As will be understood, this may be the first time a user uploads documents or may be a subsequent upload to an existing account. It may be a new individual document or a series of documents. Documents may be uploaded in one of several formats including PDF, PCL, Postscript, TIFF, GIF, JPEG, BMP, PNG, or any other file format comprising text, objects, and images.

Once uploaded, the images are converted to text and the text is extracted using Optical Character Recognition (OCR). The identified transactions are recognized, extracted and tabulated in a data store or database, which can then be accessed by the system. Text extraction may be done in minutes based on the allocated resources. Before a user of the system can efficiently utilize, search and sort through the data store of transactions, the data may need to be verified utilizing an error correction procedure, that ensures one-hundred percent accuracy. The present systems and methods use key identifiers to identify and flag potential OCR conversion errors. For example, when dealing with financial transaction, running balances or identified totals may be used as a key identifier of errors in the data in the data store.

Figure 2:
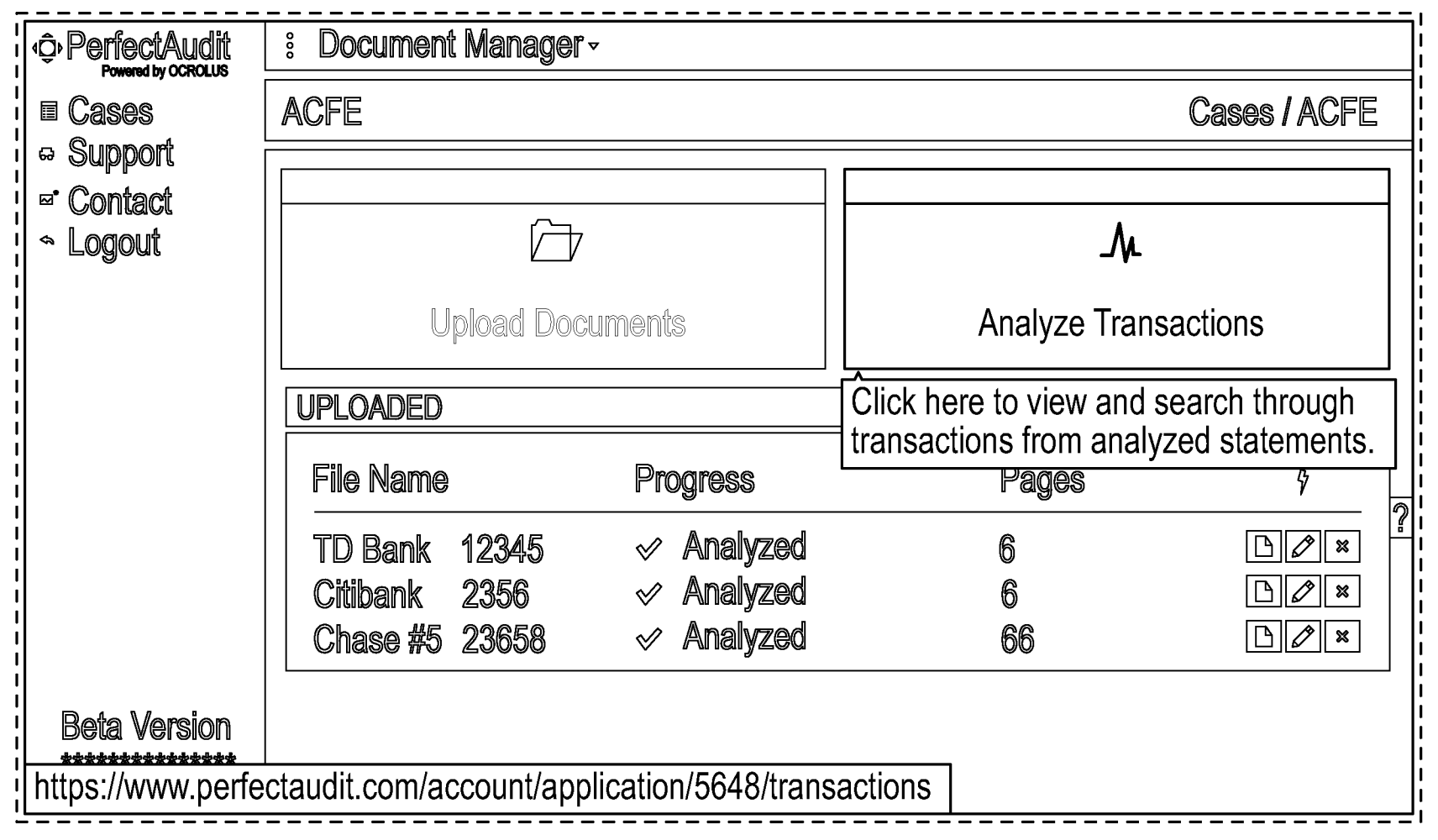

FIG. 2 illustrates a screen of the user interface prompting the user to analyze the uploaded transactions for errors. By selecting this step, the user will be directed toward potential OCR conversion errors that were detected and identified automatically by the system during document conversion and data extraction.

In an embodiment, the account balances may be used to automatically and autonomously identify potential OCR conversion errors. For example, if the most recent balance in a transaction was $2,300.00 and the next balance is $2,425.00, the present system can identify that the value of the transaction at issue must be the addition of $125.00. If the value is read correctly during the OCR process, the math will be consistent and the conversion and entry will be verified. If the OCR conversion is inaccurate, the math will not be consistent and an error may be identified. In an embodiment, verified entries were identified using unique screen identifiers, such as colored highlighting. Errors in an embodiment were identified in contrasting highlighting.

FIG. 3 represents a display in an embodiment using highlighting to indicate a series of verified transactions 300. Similarly, omitted or unverified OCR entries can be identified using visual identifiers, which can be quickly located on a display. FIG. 4 depicts transactions 400 from the uploaded documents that could not be converted by the OCR engine for any one of a number of known reasons, such as smudges, paper creases, erasures, etc. The entries are either left without highlighting or are identified with contrasting highlighting Additionally, and/or alternatively, a flag may be associated with the data point identifying and/or verifying a potential error or correctness of the associated data. The flag may be used to cull out questionable entries.

In an embodiment, as seen in FIG. 4 when a transaction 400 can not be read correctly via the OCR process, the system sets an alert that the transaction in question should be reviewed. This may be done via highlighting, or some other alert mechanism.

In an embodiment, after OCR conversion, the user may enter into verification mode. During verification the system allows the user, via the interface, to scrolls through all flagged potential discrepancies. In an embodiment, the verification tool allows the user to simultaneously view the potentially-erroneous data as it was "read" by the OCR engine while also viewing the image of the original document from which the data was extracted. The transaction under review by the user may be highlighted, and the read entry is displayed in an area of the display without obscuring the original image. As seen in FIG. 5 entries 500 indicate entries that were converted correctly via OCR. Entry 501 indicates the entry under investigation, which has been flagged by the system as potentially being incorrectly converted via OCR and area 502 displays the corresponding OCR data that was read from the original document.

By cross-referencing the read data from area 502 with the actual entry 501 itself on the statement, the user can easily identify if an error exists. It will be understood that the identification of an entry as a potential error does not automatically imply an error occurred, merely that the system is not one-hundred percent confident in the read function. As can be seen, in FIG. 5, the data in area 502 does correspond to the entry 501.

As will be understood, error correction provides for three primary functions: 1) a review and revision the OCRed data including the transaction date and/or the transaction amount; 2) the revision and entry of an entirely overlooked transaction into the database; and 3) the deletion of extraneous information that was incorrectly perceived as a transaction. In an embodiment, a lack of highlight may be used to alert the user that a transaction was overlooked entirely by the OCR engine. As seen in FIG. 6, a user can easily determine when this occurs by viewing a page of transactional data with an eye on unshaded data such as area 601. As can be seen, in entry 601, the "2/26, State Ins Fund Wrkrs Comp, $160" indicates that the transaction was overlooked. An overlooked transaction causes the system to detect a perceived error in entry 602 because the reconciliation with account balances appears to be incorrect. Once the user inputs data into the system correcting the entry by adding the overlooked transaction to the database, the system may automatically re-reconcile.

In an embodiment, the system queries the user to review transaction 602. Although the transaction was actually read correctly, the running total value does not reconcile with the running balance of the account due to the overlooked transaction above. Because the system overlooked transaction 601, transaction 602 is perceived as an error. When verifying the transaction value of −$6.25 for transaction 602, the system identifies that a mistake is present. To correct the problem the user interfaces with the system via the user interface. The user may be prompted to select the appropriate behavior from area 600 such as NEW TXN (New Transaction) button 603 and enter the overlooked data as such.

FIG. 7 depicts the GUI display indicating that the new entry 701 has been completed and that entry 702 is still in error. When the confirm button 703 is selected, the newly entered information will be stored to the data store and the corresponding database will automatically update. The newly corrected data is dynamically updated to the database and continuously incorporates user-entered information to eliminate the need to inspect certain transactions that were incorrectly flagged for review (i.e., transactions that the system perceived were read incorrectly but in fact were read correctly), and to further focus in on actual errors.

Accordingly, as represented in FIG. 8, once the user enters and confirms the value of transactions 701 and 702, which were previously highlighted, the system will automatically, in real time, display the entries as indicating that the values now reconcile with the running total.

In an embodiment, the present system may identify certain data as a transaction, when in fact, such data from the input documents are not transactions at all. These types of transaction entries, will also be flagged for user review. Because of the imprecise nature of OCR, the system must be able to identify when extraneous information, such as an account number, text on the footer of the page or text beneath a check image, is misidentified as a transaction. FIG. 9 represents a screen shot from a display of uploaded check images 900. As seen in FIG. 9, the information 901, below the check image has been incorrectly identified as part of the general list of transactions, when it is in fact an account number. The appropriate user behavior is to click the "Not Txn" button 903 in area 902 indicating that the highlighted information 901 is not a transaction. Once the Not Txt button 903 has been clicked, the false transaction is removed from the database.

Since all transactional data must align with transaction balances, the error correction process will yield one-hundred percent error free data. Even if a user makes a manual entry mistake, when trying to correct an error in the statement, due to its real time updating, will not reconcile correctly and the system will generate an alert of the numerical inconsistency in the same manner as if the entry had been pulled via OCR.

There are many formats for presenting financial data. While presentation may vary, the majority may be classified as running balance statements (balances are listed after every transaction), daily balance statements (balances are listed after every day in which transactional activity occurs), and monthly balances statements (balances are listed at the beginning and end of each monthly statement). The error correction process utilized in the present disclosure is similar no matter what type of statement is being reviewed; however, the more frequently that balances are listed, the quicker and more precisely the system can hone in on errors.

For example, in a statement within a daily balance transaction register, if on February 12, there are three transactions that total $120 and the starting balance is $300 then the system expects that the beginning balance on February 13 will be $180. If however, the system converts the February 13 balance to $200, the system will detect that an error occurred, but does not know which entry caused the error or if the balance is in error. In an embodiment, all three transactions will be identified for review as potential errors because the system knows than an error has occurred.

Because of the nature of this statement, i.e., daily balance vs. running balance, the system cannot autonomously detect which of, or how many of the three transactions were misread. The system does automatically detect that an error occurred on February 12, but it cannot pinpoint where exactly the error may be. If upon review, an entry is revised, e.g. one of the transactions is changed from −$50 to −$30, the user would only need to review and correct that one specific transaction. This is because after the change and selecting confirm, the remaining two transactions will no longer be identified as errors as the system automatically, in real time, updates the series of stored display transactions. Accordingly, even though all three transactions were initially indicated as errors, only one correction is required for the system to move past all three prior identified transactions.

The same procedure applies on a larger scale for statements that only list beginning and ending monthly balances. If all of the transactions are read correctly on the first pass, every transaction may be highlighted in green or indicative of a correct transaction, because the system will confirm the reconciliation. However, if even one error occurs during translation, all transaction for the indicated period will be flagged as possible errors because the system cannot automatically determine exactly where the error took place. If there is a single misread transaction on a statement that only lists beginning and ending monthly balances, then on average, the user will only have to review half of that statement's transactions in order to find and rectify the one error.

As will therefore be appreciated, the system works most effectively on running balance statements, followed by daily balance statements and then monthly balance statements. Once the error correction procedure is completed using verification mode, the result is a database of one-hundred percent accurate transaction information.

FIG. 10 depicts a display on a user interface for investigation mode in accordance with the present disclosure. In investigation mode, a user can sort, search, filter, reorder and reorganize transaction data to locate items of interest. In an embodiment, most transactions of interest can be located using fundamental search tools available in investigation mode. Typical, investigations may be conducted based on date, dollar value, description, account source, deposits, transfers, withdrawals, debit card transaction checks, etc.

Sorting by value is especially useful because it allows the user to quickly and easily identify high-value transactions, repetitive transactions or transactions of an exact amount. Similarly, a general keyword search allows for easy and rapid identification of parties paid, sources of income, cash transactions, debit card transactions and others.

FIG. 11 depicts a display in investigation mode where the criteria has been set to search for all deposits. As seen in FIG. 11, all transactions are searched and as seen on the display, only the deposits are displayed for the user to review. In investigation mode, each displayed transaction is dynamically linked back to the exact location on the original uploaded document. Whenever a transaction in the database is selected, the corresponding image of the appropriate page from the uploaded document is displayed with the exact transaction highlighted on the image. As seen in FIG. 12, image 1200 represents a snapshot of the entire uploaded statement allowing the user to focus on the specific page where the transaction originated rather than the complete uploaded documents. Entry 1201 is the underlying data supporting the transaction selected by the user while in investigation mode. Because the data entries are linked directly to the image, the user can quickly contextualize any transaction to determine its significance to the investigation. Furthermore, by linking the entry in the data with entry 1201, the user can again independently verify that the data presented is accurate.

In an embodiment of the present disclosure, the user is able to aggregate data from different sources and conduct searches on the compiled data across the different various sources or accounts. That is, accounts from different sources, of different types, and of different formats may all be uploaded and then treated as a single data store.

FIG. 13 depicts a screen that allows the user to select or filter which accounts the user wishes to search and to include or omit certain accounts for each search. It will be appreciated by those skilled in the art, that different searches and filters can be combined to conduct very precise and efficient examinations. For example, in an embodiment, a search can be used to locate deposits into a checking account or into a savings account held at different institutions or the same institution, that were made between date 1 and date 2 in any specific amount or greater.

The present disclosure includes short cuts or hot buttons tool for conducting more advanced searches without having to format complex, but common searches. The advanced search feature provides users with dedicated tools for finding recurring transactions and transfers between accounts. Unlike standard searches and sorts, the advanced searches may simultaneously take into account all three major search parameters, e.g., date, description and dollar value. In an embodiment, the user can create and save their own advanced searches and allocate hot button keys on the display to user created buttons.

FIG. 14 depicts a user display in investigation mode, with advanced search buttons 1401 and 1402. As seen selecting button 1401 will identify all detected transfers between accounts. Without any additional user action, once button 1401 is selected, the system of the present disclosure identifies and displays all transactions labeled with the word transfer and displays all exact dollar amount transfers between accounts. Any transaction described with the word transfer or an abbreviation of the word transfer is automatically identified and highlighted as indicated in entry 1403 as an identified transfer. Moreover, if the system detects an exact dollar amount match between one debit 1404 transaction and one credit transaction 1405 which occurred within seven days of each other, the user is alerted via the probable transfers list 1406.

Figure 16:
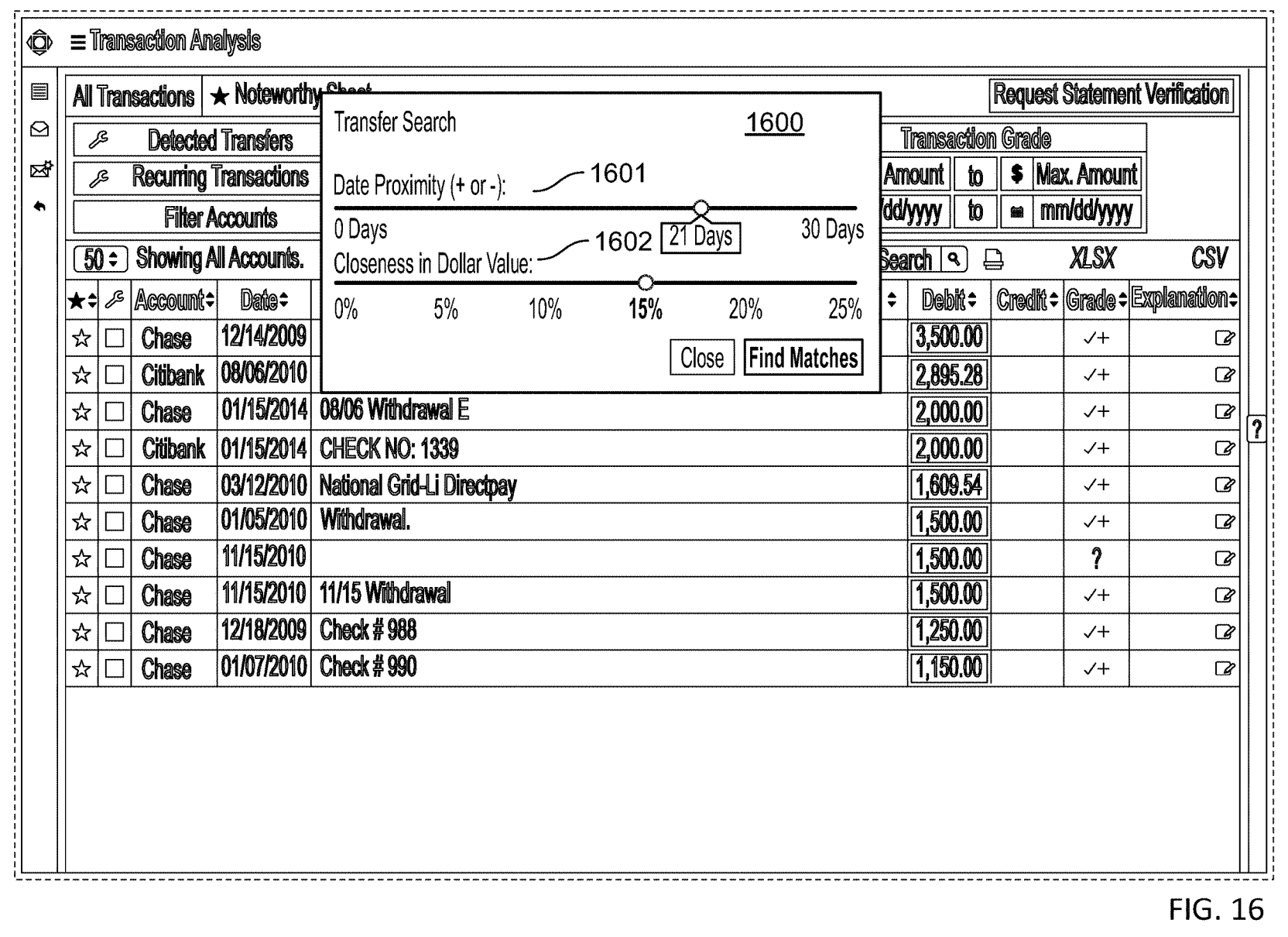

Probable transfers list 1406 displays all debit transactions for which an exact dollar amount match credit transaction exists within seven days. Additionally, a user can initiate a deeper search for transfers that accounts for the user's uncertainty in the dollar value and date parameters of the search. One example of money movement that would traditionally be difficult to track is, for example, if an individual withdrew $13,000 from bank account A and then 21 days later deposited $12,300 into bank account B. Because the two transactions occurred nearly a month apart and are not of the same value, a user might struggle to realize that the two transactions are in fact associated. The present system's advanced search features allows the system to perform unique examinations by prompting the user to first select an anchor transaction, i.e., a transaction to serve as the basis of an advanced search. If the user wishes to find a non-definite transfer, the user can first identify a suspicious deposit or withdrawal as an anchor transaction 1501 and select find transfer matches 1502 as seen in FIG. 15. As seen in FIG. 16, once the user selects find transfer matches 1502, the user is then presented with a new menu 1600 with search parameters to expand the search to locate potential matches for the anchor transaction 1501. In an embodiment, search menu 1600 includes parameters for a date range 1601 and a closeness in dollar value 1602 (0%-25%). For example, if the anchor transaction 1501's value is $2,000 and closeness in dollar value slider 1602 is set to 0%, the system will only generate exact $2,000 matches. If the slider 1602 is set to 25%, the system will show potential matches ranging from $1,500 to $2,500.

In an embodiment, the present system also provides for a unique method of locating recurring transactions. However, rather than only searching for exact matches, the system's recurring search allows a user to search for transactions with a spectrum input resolution rather than a series of binary filters. Recurring transactions are typically a series of transactions that are related in terms of date, dollar amount and/or description. In many instances, recurring transactions occur on a regular basis, such as weekly, bi-weekly, or monthly. Recurring transactions also typically have similar dollar amounts and/or descriptions. Examples of recurring transactions include: sources of income, insurance payments, regular cash withdrawals, and receipt of dividends. Since recurring transactions may only be loosely defined, classification of a transaction as a recurring transaction is algorithmically indeterminate and requires user discretion. Accordingly, in order to identify recurring transactions, the user first identifies an anchor transaction in a recurring series that will serve as the basis for the search.

As seen in FIG. 17, transaction 1701 is identified as the anchor transaction which will serve as the basis for searching out all related recurring transactions. The date (not seen), the description 1702 and dollar amount 1703 of this anchor transaction 1701 will be compared against all of the other transactions in the database to locate the most likely potential matches. When the user selects find recurrences 1704 the user will be prompted with menu 1800 which allows the user to convey to the system how important each parameter is. The user can select criteria regarding amount, description date and frequency which will in turn generate a results list of the most probable matches for the user to review and confirm or reject as matches.

FIG. 19 depicts the results list from a recurrence search. In an embodiment, the criteria depicted on menu 1800 are not exact because if the user defines the exact parameters of a search using date and dollar value, it is possible that the transaction for which the user is searching will be missed because some parameters may be just beyond the user-defined values. For example, a user searching for a certain transaction between $1000 and $1150 during July and August of 2014 may miss a transaction credited to the account on September 1. However, using looser or fuzzy search criteria, the definitions used during the recurring search feature of the system benefits from an indefinite approach whereby all potential matches are sorted by estimated probability of match. In that manner, a user does not have to decide on a hard cutoff when looking for transactions, and instead may search confidently even in the face of uncertainty. Another benefit of the system's recurring search feature, is that it not only allows for uncertainty in the search process, but it accounts for uncertainty by incorporating it into the search process. When a user selects an anchor transaction 1701 as the basis of the user's recurring search, the user is presented with the parameters seen in menu 1800.

Typically, basic searches are a logical union or intersection of binary filters, an approach that suffers from loss of resolution. That is, searches and especially recurring searches, use inputs that more accurately represent and quantify a spectrum. For example, suppose that the recurring transactions that are being searched for are social security payments. In that case, the dollar amount of the transactions in question (first slider in menu 1800) are very consistent. Additionally, the description (second slider of menu 1800) of the payments as they appear on different bank statements are fairly consistent, and there is loose consistency of the monthly recurrence (third and fourth sliders) because, although Social Security is paid out monthly, it is not paid on the same exact day every single month. Unlike a traditional search, the recurring search in the present disclosure takes into account varying degrees of certainty in the three parameters (date, description and dollar value), and uses that uncertainty to the user's benefit in quantifying potential matches.

As seen in FIG. 19, the result of the search is a sorted list of all transactions in the database, wherein the sorting order, i.e., the position of any given transaction on the list, depends on the estimated probability that the given transaction is a match, meaning that it is classified as part of the same recurring series as the anchor transaction 1701.

Once a user selects all the appropriate matches 1901, selects save and names the series (in this case Social Security), the transactions 1901 which were selected will be permanently highlighted and labeled. As seen in FIG. 20, the previously identified transaction 1901 are all highlighted and labeled 2001 as being part of the same recurring transaction.

The present system may run on a server, a series of servers, a network or a series of network. The system may be run on a cloud based platform or a local network. In an embodiment, the system runs on a virtual private network (VPN), such as Amazon VPN with commercial level infrastructural security of the uploaded content. More specifically, because the system provides for the input of financial and other private information, security of that information is paramount to system operation. Computer security of the present system comprises mainly preventive measures, e.g. firewalls. A firewall can be defined as a way of filtering network data between a host or a network and another network, such as the Internet, and can be implemented as software running on the machine, to provide real time filtering and blocking. Another implementation may be a physical firewall which consists of a separate machine filtering network traffic.

Figure 21:
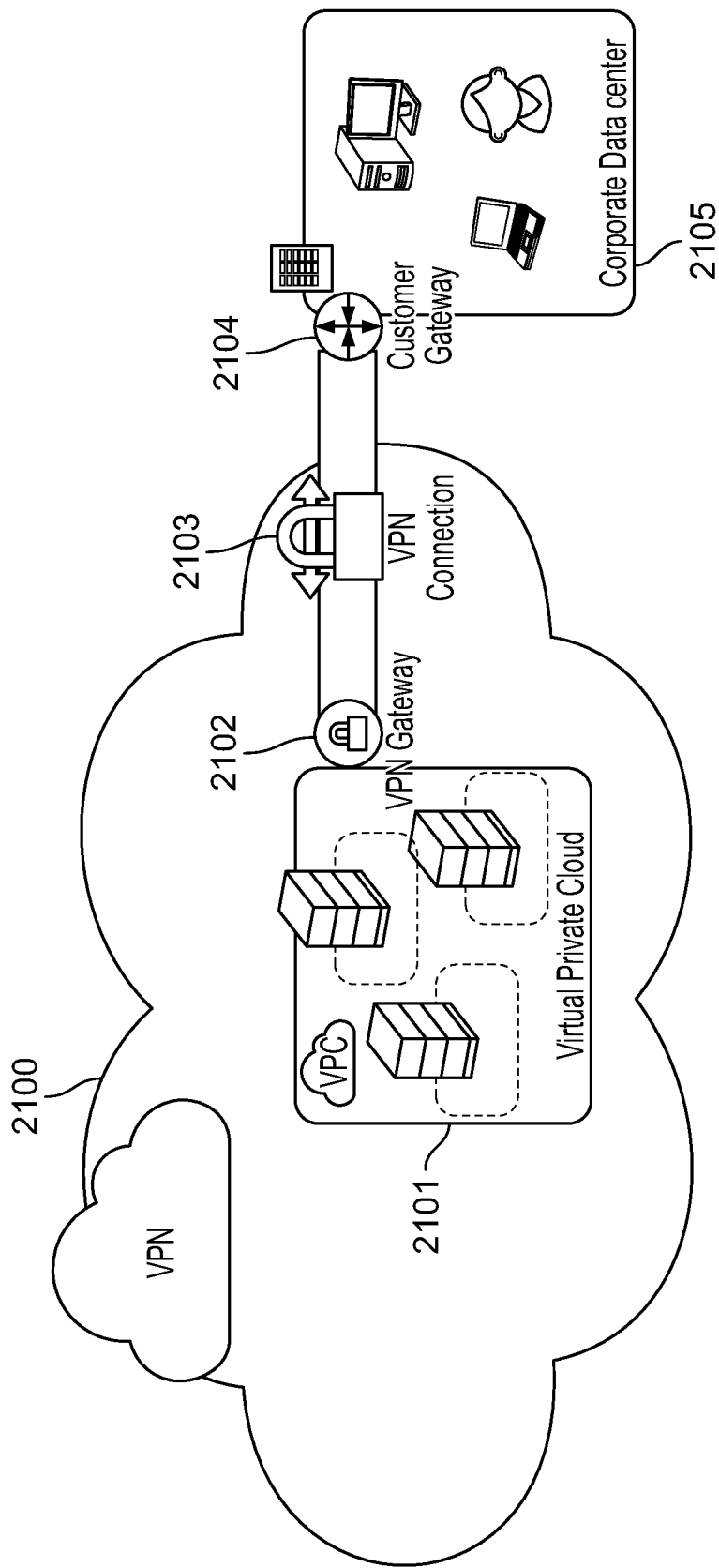
FIG. 21 is an illustration showing an exemplary system in accordance with an embodiment of the present disclosure.

FIG. 21 depicts the main components of the system in an embodiment and comprises a VPN 2100, a virtual private cloud (VPC) 2101, a gateway 2102, a two way gateway 2103 and a corporate gateway 2104 coupled to a data center 2105. VPN 2100 may be a private network or a commercial network such as Amazon Web Services. VPN 2100 extends a private network across a public network, such as the Internet. The VPN 2100 allows users, using a browser, to send and receive data over shared or public networks as if their computing devices were directly connected to the private network. In the manner, the users benefit from the functionality, security and management policies of the private network. VPC 2101 may be part of a commercial cloud computing service such as Amazon, that provides users with a virtual private cloud space, by allocating and provisioning a logically isolated section of a cloud platform. Users are able to access the VPN over an IP based network. VPN 2102 is a gateway that allows secure communication into the private cloud between VPC 2101 and the VPN 2100. VPN connection 2103 enables users to connect between data center 2105 via gateway 2104 and the VPN 2100 and communicate to the VPC 2102. This connection allows the user to interact with the instances within VPC 2101 as if the users were within the existing network. Gateway 2104 establishes the link between the customer datacenter 2015 and VPN 2100. Customer datacenter 2105 is the user data center as the user may be accessing the system via web browser or other network portals.

Figure 22:
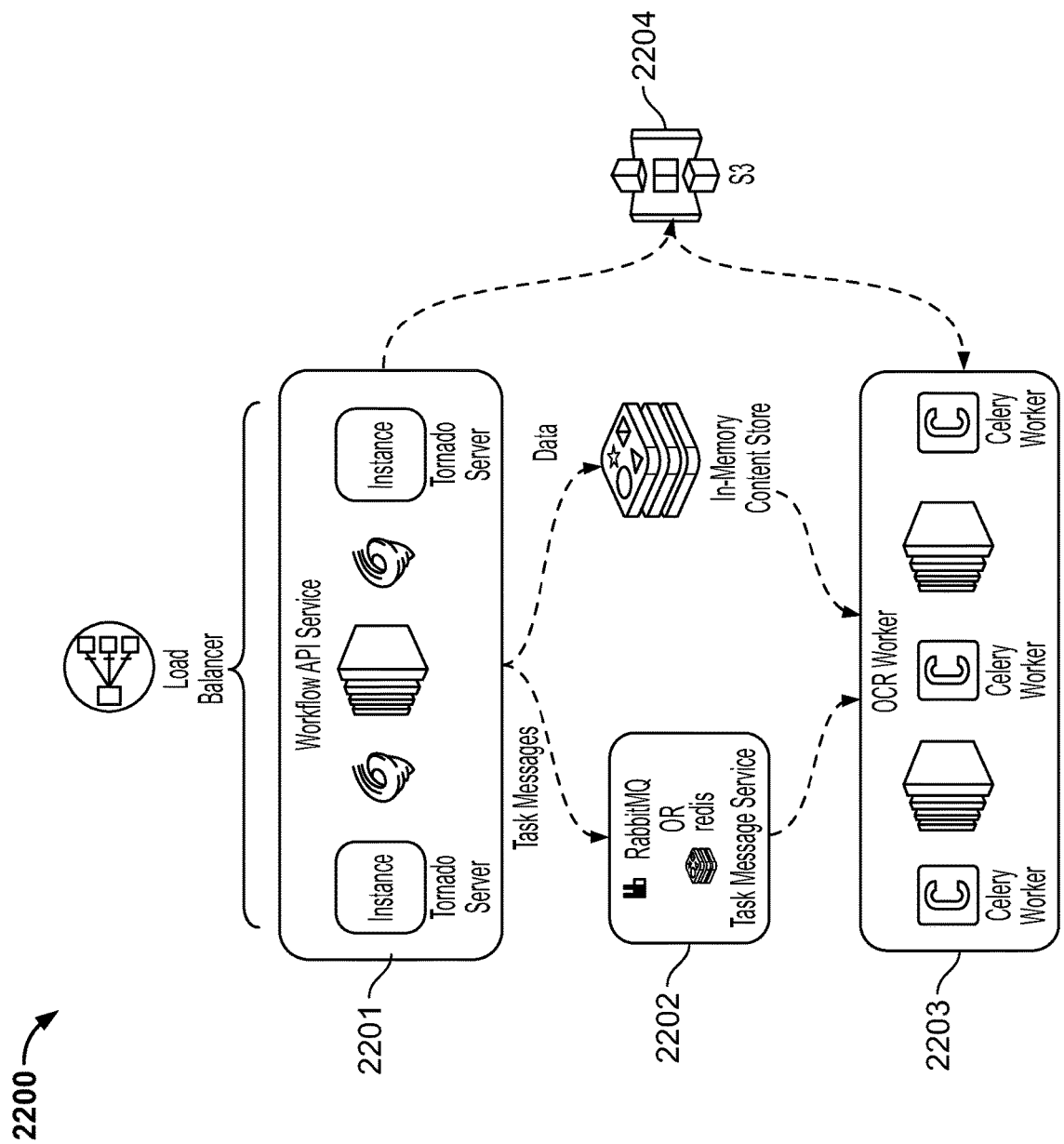
FIG. 22 is an illustration showing the components in an exemplary system in accordance with an embodiment of the present disclosure.

FIG. 22, depicts the program components of system 2200. System 2200 may comprise at least 3 major components, with each component comprising multiple sub-components. As will be appreciated by those skilled in the art, more or less of these components may be used and more or less may be combined into other components. The components of system 2200 may be implemented on computers, servers, workstations, or any other hardware or software based platform.

Workflow application interface (API) service 2101 may comprise one or more scalable, non-blocking web server and web application framework such as a Tornado web server. Servers 2100 may serve web contents with non-blocking network I/O to maximize system throughput. Message broker 2102 may be a message-oriented middleware application that implements advanced messaging protocol utilizing hardware or software of both. Message broker 2102 may be RabbitMQ or similar type service, such as a Redis message broker for passing the transient content such as process batch status, etc. between the workflow API 2201 and the OCR engine 2203. Storage servers 2204 may hold all user documents in a secure and redundant form, to ensure both security and availability. OCR Engine 2203 may comprises a series of servers running an asynchronous task queue/job queue based on distributed message passing. The servers within OCR engine 2203 focus on real-time operation, but supports scheduling as well. The servers may comprise single or multiple core platforms and may be implemented on a single machine, or multiple machines. In an embodiment, a Celery engine provided the required parallel processing of the scanned input document. The execution units of the engine 2203, called tasks, may be executed concurrently on a single or more worker servers using multiprocessing, events. The tasks can execute asynchronously (in the background) or synchronously (wait until ready). At the core of technical stack are OCR and transaction recognition procedures.

As indicated above, the system of the present disclosure allows for the uploading of scanned or electronic statements in a variety of formats.

The heart of the system relies on OCR engine 2203. Optical character recognition (OCR) is the mechanical or electronic conversion of images of typed, handwritten or printed text into machine-encoded text. It is often considered a field of research in pattern recognition, artificial intelligence and computer vision. It is widely used as a form of data entry from printed paper data records. It is a common method of digitizing printed texts so that it can be electronically edited, searched, stored more compactly, displayed on-line, and used in machine processes such as machine translation, text-to-speech, key data and text mining.

Very often to enhance the functionality, OCR "pre-processes" images to improve the chances of successful recognition. Some OCR pre-processing techniques that may be used in the present system include, but are not limited to de-skewing, such as in the case of the document not being aligned properly when scanned; de-speckling, which is the removal of positive and negative spots and smoothing the edges; binarization, which includes converting an image from color or greyscale to pure black-and-white. The task of binarization may be performed as a simple way of separating the text (or any other desired image component) from the background. Additionally, the binarization task is often necessary since most recognition algorithms work only on binary images.

Some other preprocessing technique that may be used, is line removal, which cleans up non-glyph boxes and lines; layout analysis or zoning, which identifies columns, paragraphs, captions, or other features as distinct blocks. This is especially important when processing multi-column layouts and tables. Line and word detection helps establishes a baseline for word and character shapes and may separate words if necessary. Character isolation or segmentation is a preprocessing process for per-character OCR. That is, multiple characters that are connected due to image artifacts must be separated prior to recognition and single characters that are broken into multiple pieces due to artifacts must be reconnected.

As will be understood, OCR accuracy can be increased based on the amount of preprocessing performed. It may further be enhanced if the expected output is constrained by a lexicon, i.e., a list of words that are expected and allowed to occur in a document. Such a lexicon may be for example, all the words in the English language, or a more technical lexicon for a specific field. For example, tesseract uses its dictionary to influence the character segmentation step, for improved accuracy. More sophisticated OCR systems such as the one embodied in the present disclosure can preserve the original layout of the page and produce, for example, an annotated PDF that includes both the original image of the page and a searchable textual representation.

Near-neighbor analysis is another technique that may be used to enhance accuracy. Near-neighbor analysis can make use of co-occurrence frequencies to correct errors, by noting that certain words are often seen together. Knowledge of the grammar of the language being scanned also helps determine if a word is likely to be a verb or a noun, for example, allowing greater accuracy. As will be understood, beyond an application-specific lexicon, better performance can be had by taking into account business rules, standard expression, or rich information contained in color images. Such a strategy that may be employed in the present system is known as "application-oriented OCR" or "customized OCR". Such systems may be used to OCR of license plates, business cards, invoices, screenshots, ID cards, driver licenses, and automobile manufacturing.

Nevertheless, despite technological advancement, OCR accuracy can still be confused by some or all of the factors and preprocessing steps discussed above. In the field of financial statement, for example, the present system can greatly reduce the number of OCR misreads by accumulating a knowledge base of templates used by financial institutions in the period of past 30 years, for example to aid with the OCRing of a specific document.

Most OCR algorithms produce the read as tree-like structure, for example, starting at a root of the tree, the root node represent the page, which can have multiple child nodes to represent paragraphs, which again may have multiple child nodes to represent a line of text, then a word, and finally, a character. It is typical that at every level, locational information is associated with the read in the form of a bounding box on the page. Additionally, in some OCR algorithms, a confidence level can be produced along with the text and locational information.

General purpose OCR algorithms try to process every character, image, lines, etc. on any given page. On the other hand, when considering a financial statement, a large portion of any financial statement may be ignored if the purpose of OCR read is to locate and gather transaction information. It is therefore advantageous to have knowledge of the relationship of key information (such as the name of the bank, statement month and year, account number, begin and ending balance, etc.) and the location where the system expects to look for and find this information. It is therefore critical to have a mechanism to programmatically proof read program results. That is, the program's behavior is most often deterministic. Meaning, that if it performs the same procedure multiple times is should not yield more optimistic results. However in the present system, it is common to engage in a trial and error approach to maximize OCR accuracy, that involves performing a multi-step image pre-processing, subsequently followed by a transaction detection, which often results in multiple execution paths that have overlapping sub-paths. This multi-step approach is important to the unique execution optimization employed in the present system.

The system handles both processing and storage of the large volume of such uploaded documents. This poses two technical challenges. First, document processing time and second, document storage, transaction detail storage, and searches.

In an embodiment, to estimate resources required, the first step is to collect information about the conversion exercise and the processing options that are available. Typical criteria may include document-related data; number of documents; average number of pages per document; image type (Black & White, Grayscale, Full Color); type of input file (TIFF, PDF . . . ); document resolution (200 dpi, 300 dpi . . . ); typical document page size (US Letter, A4, A3 . . . ); typical document text density; available processing options; auto-rotate; de-skew; line removal; de-speckle; PDF/A; compression, etc.

Second, the system needs to estimate the complexity and generate a complexity rating to assign to the operation. Complexity rating may be approximated based on assigning a rating for the following criteria:

TABLE 1

| Low | Medium | High | Very High |
| --- | --- | --- | --- |
| TIFF Image Source200 DPI | PDF File Source300+ DPIHigh Text DensityGrayscale Images Auto-rotate Bitonal Compression | Color TIFF or PDF ImagesLarge Format | Color MRC Compression |
| US Letter/A4 | | | |
| Medium Text Density | | | |
| Bitonal/Black & White | | | |
| ImagesDeskew | | | |
| Line Removal | | | |
| PDF/A | | | |

Next, to properly allocate and design the system, the estimating Pages Per CPU Core Hour (PPCCH) must be approximated. OCR and compression processing may be highly CPU-intensive so in an embodiment, a high-performance server with Intel® i5 processor or better was used. Based on the complexity scale, a PPCCH value may be generated.

TABLE2

| Complexity | PPCCH |
| --- | --- |
| Low | 3000 |
| Medium | 1500 |
| High | 900 |
| Very High | 600 |

Once the PPCCH value is calculated, number of CPU cores required can be computed. While the theoretical maximum number of CPU Cores that are available is based on the number of servers*number of CPU cores/server there are a number of other factors that can reduce this absolute number.

First, if the system is largely dedicated for OCR use, it is recommended to leave at least 1 CPU Core available for non-OCR system use. In addition if other applications and services are running it is prudent to be conservative about the number of cores available.

Second, by default OCR jobs will only use one CPU core. It is possible to increase this to a maximum of 10 cores if multi-core usage is available. Another option may be to use, a threads setting which is intended for use with documents that have a large number of pages (200+) since it works by splitting document into 2 or 4 chunks and processing each in parallel. Another alternate approach is to configure multiple concurrent parallel jobs in OCR—i.e. have 2 or 4 jobs that can run in parallel.

Once the number of cores is identified, the estimated time required to run the conversion can be computed. The number of hours required is $$\frac{P}{(PPCCH*C)},$$

where P=Number of Pages, C=Number of usage CPU Cores, and PPCCH=Pages per CPU Core Hour. In an example, a medium complexity conversion job of 500,000 pages using two CPU cores would require 500,000/(1500*2)=167 hours to complete. Accordingly, in order to process the 167 hours of work in 8 hour requires both computing in parallel (accomplished by the OCR engine 2203 using the Celery workers) and advanced technique such as using GPU (Graphic Computing Unit). As will be understood, to reduce processing time the system can rely on additional cores. Accordingly, processing may be accomplished in a number of hours or minutes. Specifically, the present system may process even a large job comprising several thousands of pages in 1 minute, 5 minutes, 15 minutes, 30 minutes, etc.

In the second phase of the process, the requirements for document storage, and transaction detail storage and inquiry needs to be identified. More specifically, an image file for single page documentation typically occupies at least kilobytes in size. Accordingly, using a typical example of document size and complexity, it is clear that the storage requirement for one year's worth of data of uploaded documents may reach into the terabytes in size. Additionally, OCR software often requires image pre-processing that can easily double or triple the storage requirement. In the present system, image pre-processing must be accomplished in the most effective ways possible in control and minimize the volume of work.

In typical financial statements, the transaction section of the financial statement is often formatted such that natural language processing capability of OCR does not necessary enhance read accuracy, but instead only adds program inefficiency. Instead, in the present system, the OCR engine 2203 is able to use transaction data after finishing the OCR "reading", thereby using the detection results as a feedback mechanism to provide hints of how well OCR did. For example, a completely upside down page image will likely result in poor OCR read which can be captured by its confidence level. However, a page that contains multiple check images will likely result in low confidence level as well, which makes it an unreliable predictor. In these cases, transaction detection results can be used to influence the OCR engine 2203 to perform a variety of pre-processing steps, including page image rotation, for example A simplistic implementation of utilizing transaction detection relies on regular expressions to identify transactions in a line by line fashion, with each line abiding to certain rules or patterns. In reality, however, a transaction can be spread across multiple lines, with parts of each line containing information belonging to a different transactions, etc. In those cases, segregating the page into information blocks becomes a very convenient way to enhance the OCR performance.

The present system uses knowledge about the layouts of the financial statement to help improve either read accuracy or read performance or both. Absent that, the system's ability to scan forward and backward and perform cross reference of the data is an absolute requirement. The uniqueness and advantage of the present system starts with a generic OCR approach to ensure good coverage on font, language character set, color, etc. next, the system takes a practical approach to narrow down OCR read on the identified blocks that are of interest to the specific application, i.e., the transactions. This is determined by searching the statement and matching it to a template in a database that learns and gets more comprehensive over time.

Another aspect of the present system allows for the system to identify and highlight an identified bounding box for any financial transaction detected by the system. As seen in FIG. 23, individual financial transactions are identified by the bounding boxes 2301*a* and 2301*b* and identified as individual transactions or objects 2302*a* and 2302*b*. The present system utilizes the bounding box to identify the geographic location of the information on the scanned document and generates a spatial index linking the X and Y location of the information on the document to the transaction that has been extracted. The information within a bounding box is then treated as a single transaction.

In another aspect of the present disclosure, Directed Acyclic Graph (DAG) may be used to improve performance. A DAG is a directed graph with no directed cycles. That is, it is formed by a collection of vertices and directed edges, with each edge connecting one vertex to another, such that there is no way to start at some vertex v and follow a sequence of edges that eventually loops back to v again. DAGs may be used to model many different kinds of information. The reachability relation in a DAG forms a partial order, and any finite partial order may be represented by a DAG using reachability. A collection of tasks that must be ordered into a sequence, subject to constraints that certain tasks must be performed earlier than others, may be represented as a DAG with a vertex for each task and an edge for each constraint; algorithms for topological ordering may be used to generate a valid sequence. Additionally, DAGs may be used as a space-efficient representation of a collection of sequences with overlapping subsequences. DAGs are also used to represent systems of events or potential events and the causal relationships between them. DAGs may also be used to model processes in which data flows in a consistent direction through a network of processors, or states of a repository in a version-control system.

An application of directed acyclic graphs arises in the concise representation of a set of sequences as paths in a graph. For example, the directed acyclic word graph is a data structure in computer science formed by a directed acyclic graph with a single source and with edges labeled by letters or symbols; the paths from the source to the sinks in this graph represent a set of strings, such as English words. Any set of sequences can be represented as paths in a tree, by forming a tree node for every prefix of a sequence and making the parent of one of these nodes represent the sequence with one fewer element; the tree formed in this way for a set of strings is called a trie. A directed acyclic word graph saves space over a trie by allowing paths to diverge and rejoin, so that a set of words with the same possible suffixes can be represented by a single tree node.

Figure 24:
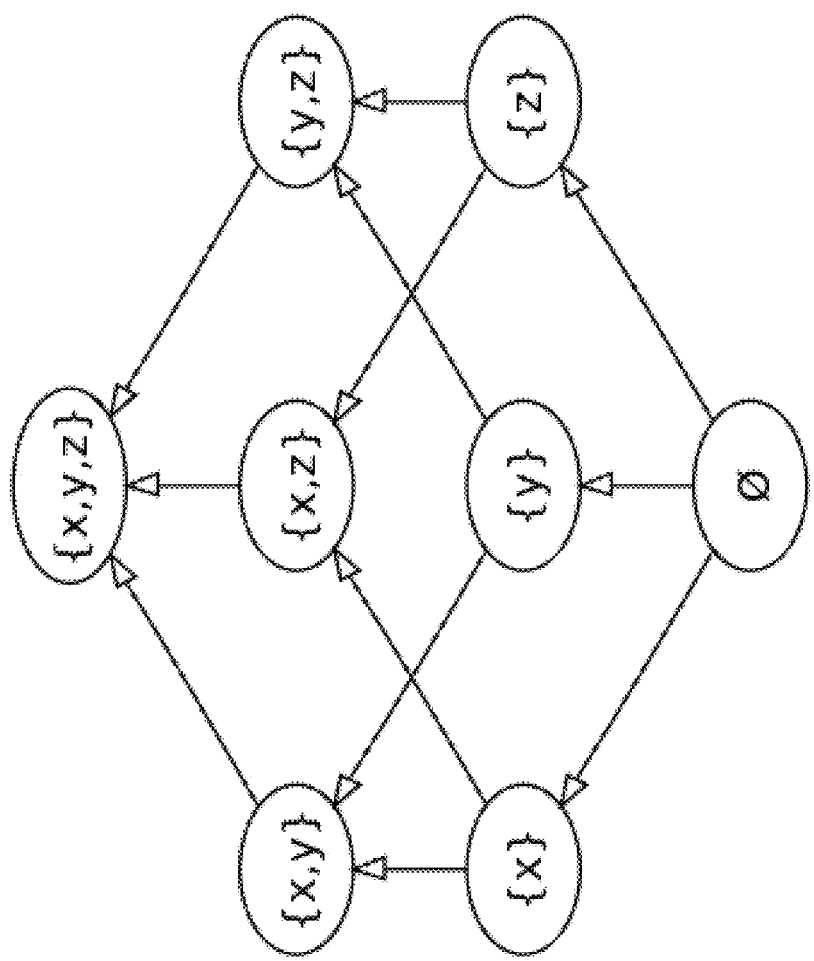
FIG. 24 is an example of a Directed Acyclic Graph in accordance with an embodiment of the present disclosure.

The present system relies on DAG to model the image (pre)processing, OCR and transaction detection components. For example, if there are 3 image pre-processing steps available, e.g., X:Image binarization; Y:Gaussian elimination; and Z:image rotation (90 degree), depending on the quality of the original document, the present system may choose to perform 1, 2 or all 3 steps. As seen in FIG. 24 there are overlapping sub-path on the execution path.

As used in the present disclosure, by developing and utilizing a proper DAG implementation, an intermediate result can be cached that results in the elimination of duplicate computations. For example, if the orientation of a document page requires 270 degree rotation (preprocessing step Z), the present system will perform the binarization step (X) only once, cache the processed image, rotate the process image by 90 degrees (Z), cached the result, then perform another 2 rotation (Z)(Z) of 90 degrees are performed, one on top of the other in step wise manner. In this way, the processing speed is increased because the binarization step needs only to be performed once and not on all three rotations. This improvement increases accuracy, reduces processing power and improves overall conversion speed. The DAG in the enables the system to identify the effectiveness of the preprocessing and allows the system to determine if alternative preprocessing steps are required. In this way the amount of steps and time required to perform effective preprocessing is reduced because the number of potential computations of preprocessing techniques is reduced and not duplicative.

The following exemplary pseudo-code illustrates how this mechanism works in the present system, where binarization is evaluated only once.

```
from mdf import MDFContext, evalnode, varnode
image=varnode( )
@evalnode
def binarization( )
return ostu-method(image( )
@evalnode
def rotate( )
return image_rotate_by_degree(binarization( ) 90)
ctx=MDFContext( )
# set image to be processed
ctx[image]=image(File('/pdf/image/image_001.png'))
# calculate stepwise processed image by modifying and layering the context
scenarios=[90, 180, 270]
```

```
for s in scenarios:
    shifted ctx=ctx.shift({binarization: rotate(s-90)})
    processed image=shifted ctx[rotate]
```

In an embodiment, the Mdf decorators (such as @evalnode, @varnode) were implemented in Cython, thereby giving maximum performance.

Additionally, to further improve processing speed of the OCR and transaction detection performance, the system may run the OCR components of the OCR engine 2203 on GPU. By running on GPU, it allows GPU computation by building on top of a GPU enabled image library such as opencv, and a high-order logic implementation such as pydatalog GPUs are Single Instruction, Multiple Data (SIMD) machines. They are a class of parallel computers they consist of many processing elements that all run the same program but on distinct data items. This kernel, can be quite complex and includes control statements such as if and while statements. However, the kernel may be synchronized by hardware, i.e., where each instruction within the kernel is executed across all processing elements running the kernel. Thus, if a kernel has to compare strings, processing elements that compare longer strings will take longer and the other processing elements will wait for them. Accordingly, the scheduling of GPU in the present disclosure may work as follows.

Figure 25:
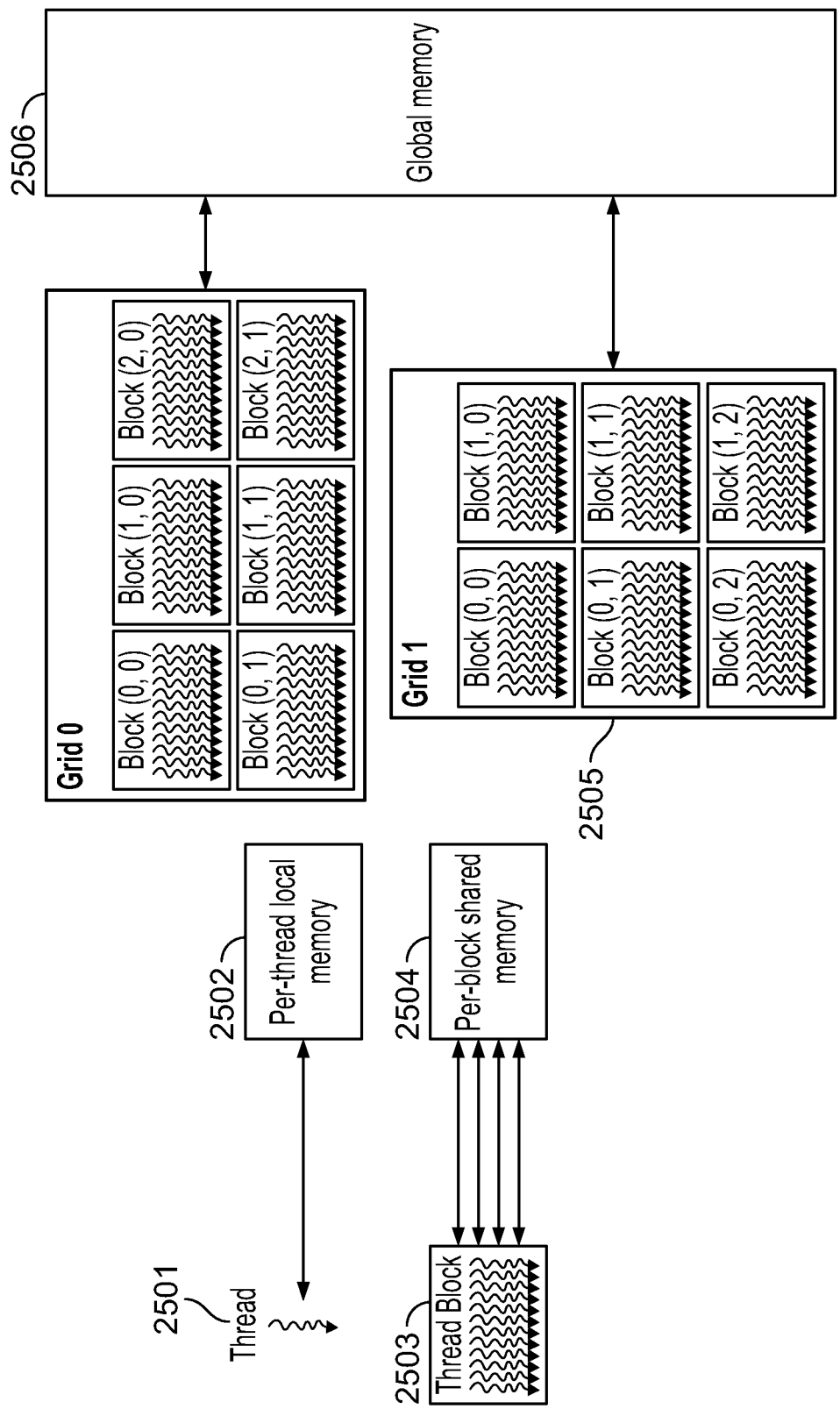
FIG. 25 is an example of a GPU memory map in accordance with an embodiment of the present disclosure.

A thread in the host platform (e.g., a multi-core) first copies the data to be processed from host memory to GPU memory, and then invokes GPU threads to run the kernel to process the data. Each GPU thread has an unique id which is used by each thread to identify what part of the data set it will process. When all GPU threads finish their work, the GPU signals the host thread which will copy the results back from GPU memory to host memory and schedule new work. GPU memory is typically organized hierarchically as shown in FIG. 25 Each GPU thread 2501 has its own per-thread local memory 2502. Threads are grouped into blocks 2503, each block having a memory 2504 shared by all threads in the block. Finally, thread blocks are grouped into a single grid 2505 to execute a kernel—different grids can be used to run different kernels. All grids share the global memory 2506. The global memory 2506 is the GPU "main memory". All data transfers between the host (CPU) and the GPU are made through reading and writing global memory.

OpenCV GPU or other open source code modules are a set of classes and functions to utilize GPU computational capabilities. They may be implemented using a NVIDIA* CUDA* Runtime API and may support only NVIDIA GPUs. The OpenCV GPU module for example, includes utility functions, low-level vision primitives, and high-level algorithms.

The standard way to provide feedback to OCR which may work well for one category of documents may perform poorly on other classes of document, such as financial statements from one institution vs. another. The challenge in processing bank statement, is that training an algorithm to "learn" how to best process financial statements varies largely from formats and contents between statements.

Accordingly, the present system solves this program by providing an easy way to use user verification tools to provide feedback. For example, it is known to have a separate execution of OCR and transaction detection per page in order to cut down overall execution time, by a parallel mechanism. However this approach poses a challenge in transaction accuracy. Some crucial information related to the financial transactions, such as statement year/month, account number, owner information, etc. may only appear on certain pages. To solve this problem, the present system uses a consolidation routine to fill in the critical pieces of information that may not be available on each page of a statement.

Figure 26:
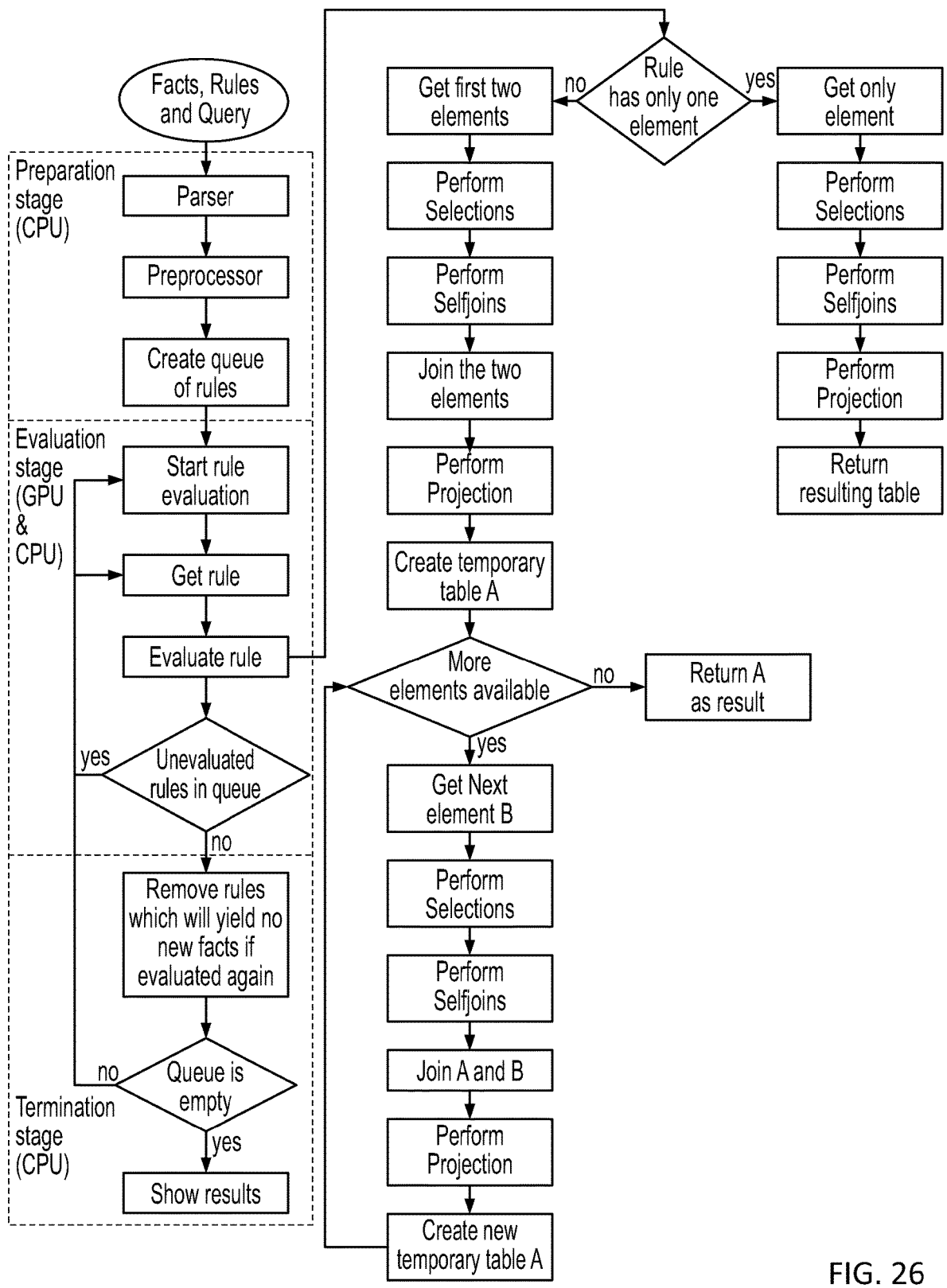
FIG. 26 is an example of the work flow of an exemplary machine learning engine in accordance with an embodiment of the present disclosure

In the present system, by using a datalog, such as Pydatalog the system supports high-order logic in functional forms. Pydatalog is used to perform a machine learning algorithm that improves transaction detection component accuracy over a large training data set. The training data may come from a relational data store that contains both raw OCR output and post-process financial transaction information with a high degree of accuracy. FIG. 26 illustrates the work flow of an exemplary machine learning engine in abstract term.

The following pseudo-code illustrates how such a algorithm may be implemented:

```
class Transaction(pyDatalog.Mixin):
#-->A transaction (date, description, amount, account,
    other_acct)
    def_init_(self, date, description, amount, account, other_acct):
        super(Transaction, self)._init_( )
        # calls the initialization method of the Mixin class
        self. date=date
        self. amount=amount
        self. description=description
    @pyDatalog.program( )
    # indicates that the following method contains pyDatalog clauses
    def Transfer(from, to, amount):
        # A transfer is a withdraw from account_from and a
          deposit in account_to
        # the following is a logical predicate vs a functional
          one.
        Transaction.Transfer[date, from, to, amount]<=from
          & to &
Transaction(date,_, amount, from, to) & Transaction(date,
    _, amount, to, from)
# An example how a transfer is detected.
acct1='001'
acct2='002'
acct3='003'
trans1=Transaction ('20150108', 'transfer from checking
    acct into saving acct', 6800, acct1, acct2)
trans2=Transaction ('20150108', 'transfer from checking
    acct into saving acct', -6800, acct2, acct1)
trans3=Transaction ('20150208', 'XXX', 800, acct1,
    acct3)
trans4=Transaction ('20150208', 'YYY', -800, acct3,
    acct1)
# query the sum of all transfers originated from acct1
? sum(X, X=pydatalog.ask('tranfer(acct1,_, X)')
```

Accordingly, by simply defining these simple rules, the deduction engine can work its way out to improve transaction accuracy such as identifying account transfers by taking advantage of a deduction engine. In a system, Pydatalog decorators were implemented by manipulating python AST (abstract syntax tree).

The utilization of high-order logic in processing bank statement is unique in the industry. High-order logic enables the reasoning engine to detect relationships between seemingly unrelated transaction High-order logic is a form of predicate logic that is distinguished from lower or first-order logic by additional quantifiers and a stronger semantics. Higher-order logics with standard semantics are more expressive, but the model-theoretic properties are less well-behaved than those of first-order logic. Higher-order logic is the union of first-, second-, third-, . . . , nth-order logic; i.e., higher-order logic admits quantification over sets that are nested arbitrarily deeply.

Figure 27:
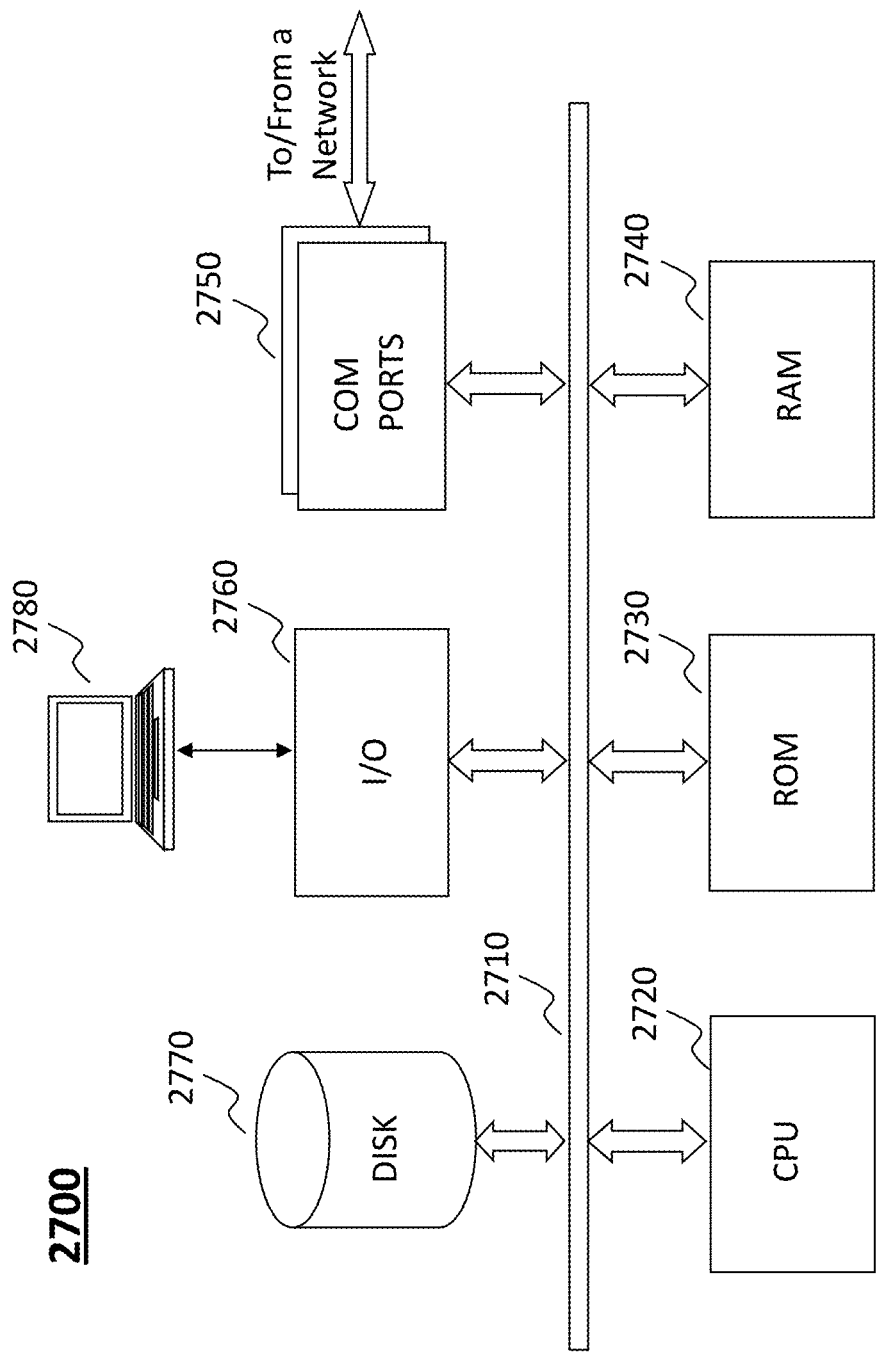
FIG. 27 is a schematic of an exemplary computing system for implementing the system in accordance with an embodiment of the present disclosure.

FIG. 27 depicts a general computer architecture, such as that found within a server or mobile device on which the present teaching can be implemented and has a functional block diagram illustration of a hardware platform which includes user interface elements. The computer may be a general purpose computer or a special purpose computer. This computer 2700 can be used to implement any components of the system and method for processing and manipulating transaction data using data processing as described herein. For example, the OCR engine 2203 can be implemented on a computer such as computer 2700, via its hardware, software program, firmware, or a combination thereof. Although only one such computer is shown, for convenience, the computer functions relating to the systems and methods for processing and manipulating transaction data using data processing may be implemented in a distributed fashion on a number of similar platforms, to distribute the processing load.

The computer 2700, for example, includes COM ports 2750 connected to and from a network connected thereto to facilitate data communications. The computer 2700 also includes a central processing unit (CPU) 2720, in the form of one or more processors, for executing program instructions. The exemplary computer platform includes an internal communication bus 2710, program storage and data storage of different forms, e.g., disk 2770, read only memory (ROM) 2730, or random access memory (RAM) 2740, for various data files to be processed and/or communicated by the computer, as well as possibly program instructions to be executed by the CPU. The computer 2700 also includes an I/O component 2760, supporting input/output flows between the computer and other components therein such as user interface elements 2780. The computer 2700 may also receive programming and data via network communications.

In one or more embodiments, a proprietary OCR system is combined with a specialized back-office program, which achieves reconciliation through human editing and validation of OCR results. The back-office program (BO Tool) provides certain features and functionality as further described below. Prior to the application of OCR, the system may perform a preprocessing on the data. In one or more embodiments, the preprocessing includes at least one of de-skewing, de-specking, binarization, line removal, layout analysis, zoning, line detection, word detection, character isolation, segmentation, applying a lexicon, near neighbor analysis, grammatical analysis, applying Benfords law, or any number of combinations of the foregoing.

Figure 28:
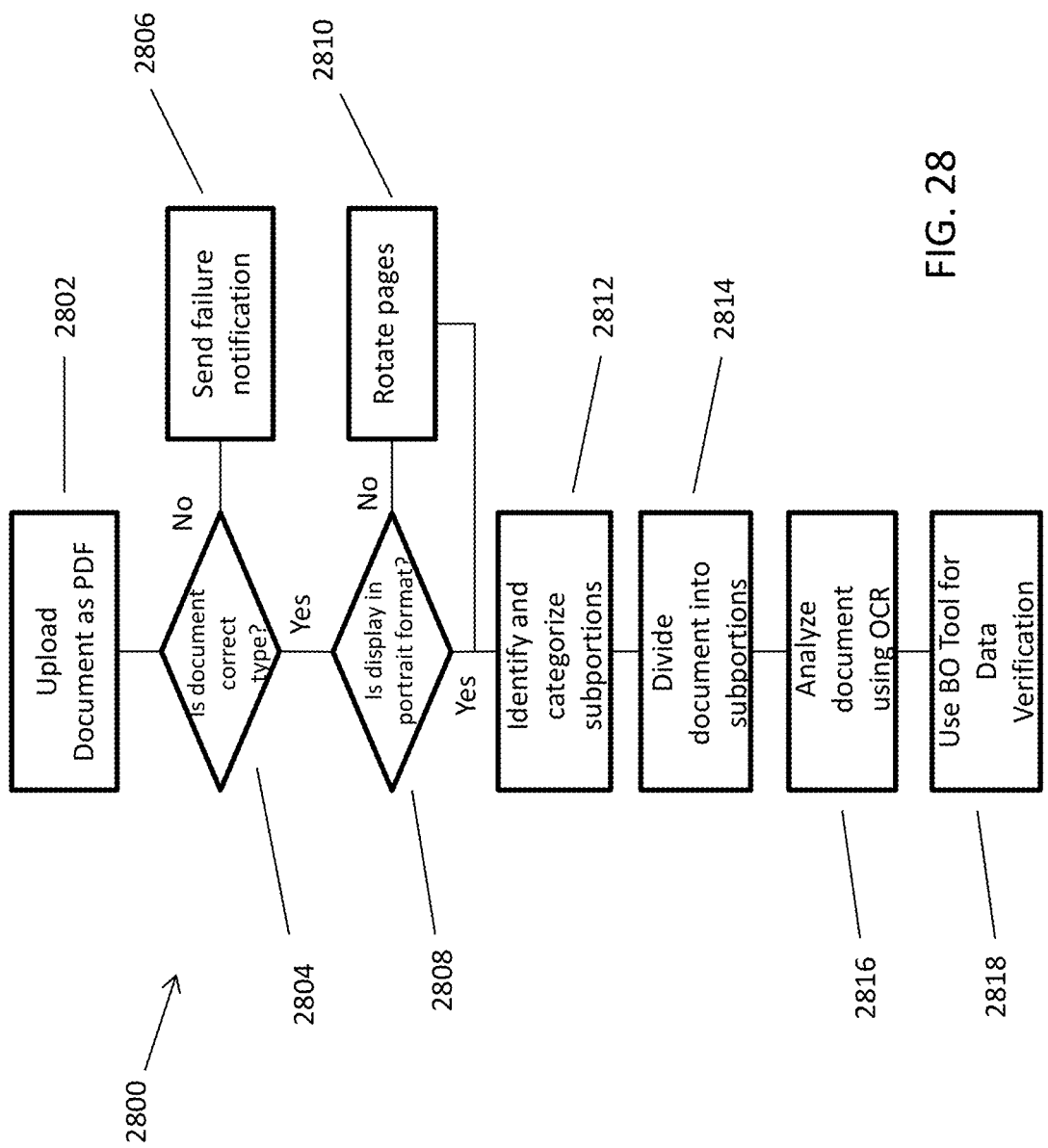
FIG. 28 is an example of a workflow for a portion of a review process according to an embodiment of the present disclosure.

According to one embodiment, as shown with reference to FIG. 28, the system implements a process 2800 that begins after an end-user uploads a bank or credit card statement as a PDF file at step 2802. In step 2804, the document is reviewed using the BO Tool to identify the document type. The use of the BO Tool may be implemented automatically through an artificial intelligence system, such as a machine vision system, or it can be implemented by a user interacting with the BO Tool. Because customers may mistakenly upload documents other than bank or credit card statements, the system must determine, in step 2804, whether or not an uploaded document is a bank or credit card statement. If it is not, then the file is rejected, and in step 2806 the system sends the customer a notification that the document is not able to be processed, and no further processing is performed on the document. The review of the uploaded file or document may be accomplished automatically through an artificial intelligence system, such as a machine vision system, or may be implemented by a user undertaking a manual review of the uploaded file or document, or a combination of both. If the document is confirmed, in step 2804, to be a bank or credit card statement, the system or reviewer will confirm, in step 2808, whether it is displayed in portrait orientation. If not, in step 2810, the system can automatically, or the user can manually, such as, for example, through a mouse click, rotate selected pages or all pages. A thumbnail view can be used to quickly locate improperly oriented pages and correct their orientation.

After identification of the document type and proper orientation of the document, in step 2812, the system identifies various subportions of the document and categorizes those subportions. The identification and/or categorization can be accomplished automatically through an artificial intelligence system, such as a machine vision system, or can be implemented by a user interacting with the BO Tool, or a combination of both. The categorization can be based, for example, on assigning an identifier or a code to each subportion of the document. For example, if the document is a bank statement, the inputted values for beginning balance and ending balance are identified. These values may be verified in a later process. In order to provide the balance data for this later verification process, an image, or a "snippet," of the beginning balance and ending balance must be taken from the image of the entire page. Thus, as shown in FIG. 29, either the system will automatically, or a user will manually, use the BO Tool to draw a bounding box around the beginning and ending balances, effectively creating a snippet, as shown in FIG. 30, that will be saved and later reviewed and verified by automatically by the system, or manually by another user, if necessary. Upon submission of this task, the system will assign the appropriate Account Identifier to each transaction identified in the document. At step 2814 the document is automatically divided into subdocuments based on its content, and the position of the segmentations that separate subdivisions may be edited through the BO Tool, which can be implemented using the identifiers or codes assigned to the various subportions of the document in step 2812.

Figure 31:
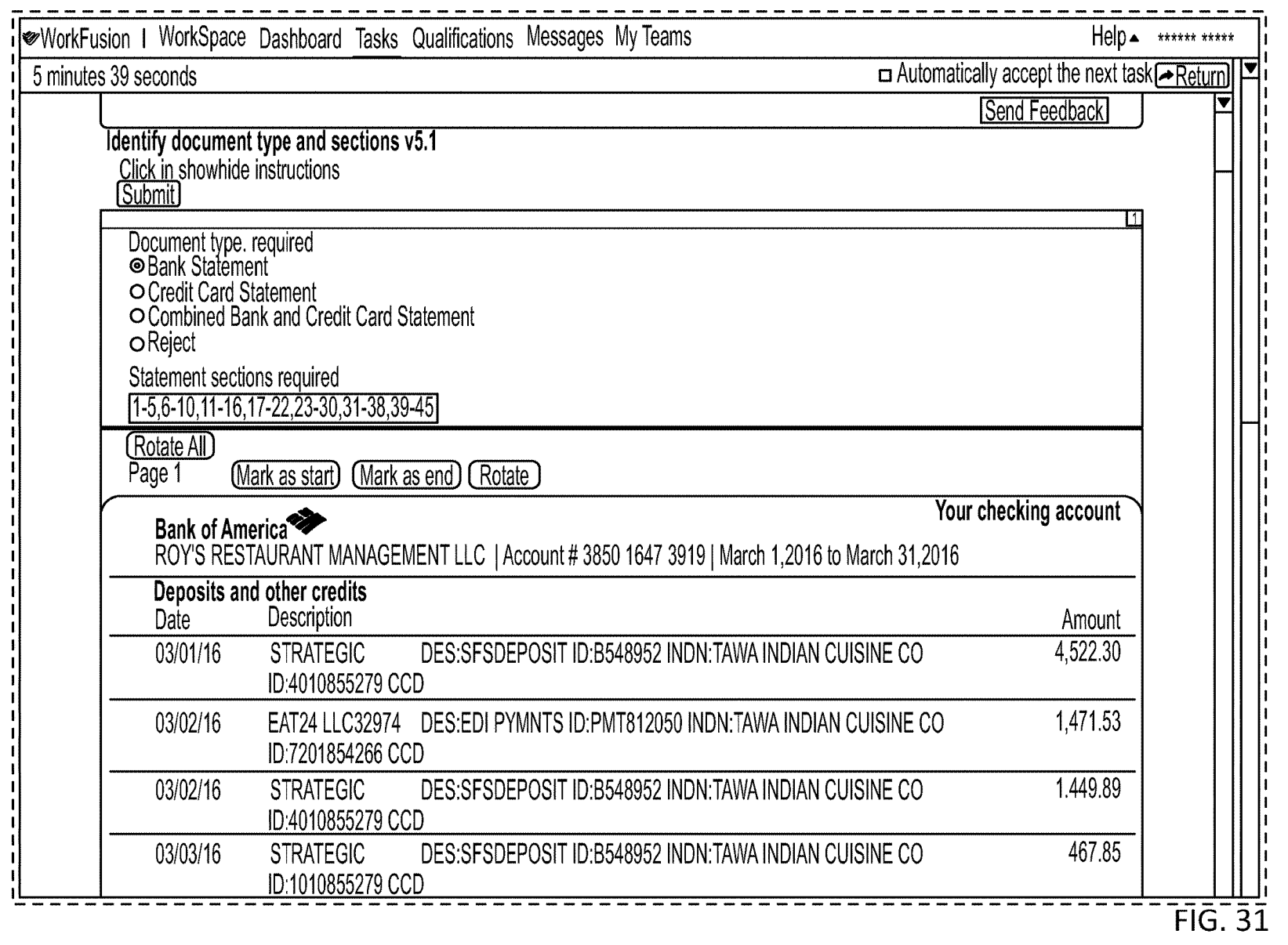

In one or more embodiments, the primary method of segmentation is by beginning account balance and ending account balance. An uploaded document may contain many months of bank statements, which can be logically split where the beginning and ending balances appear on the statement. If the statement does not contain beginning and ending monthly account balances, the document may be split, automatically or by a user manually interacting with the system, into the smallest subsections which contain all necessary information for that subsection to be further parsed independently. To enact the page splitting, either the system will automatically, or the user interacting with the system will manually, enter the page ranges for each section in the "Statement section" text box, as depicted in FIG. 31. Alternatively, using a manual approach, the user will press the "Mark as start" and "Mark as end" buttons to denote the sections. Pages without any relevant banking information may be omitted. The omission eliminates the need for later review of pages that have no relevant information.

Following the subdivision of the document, in step 2816, the document is analyzed using optical character recognition (OCR). In step 2818, the output of the OCR is fed into the BO Tool for data verification. The BO Tool breaks down the data verification process into microtasks that can be simultaneously completed automatically through an artificial intelligence system, such as a machine vision system, or can be implemented by one or more users interacting with the BO Tool, or a combination of both. When implemented by users interacting with the BO Tool, multiple users may be utilized with each user being assigned a different microtask in order to maximize throughput. The microtasks also allow for labor specialization and minimization of labor downtime.

Figure 32:
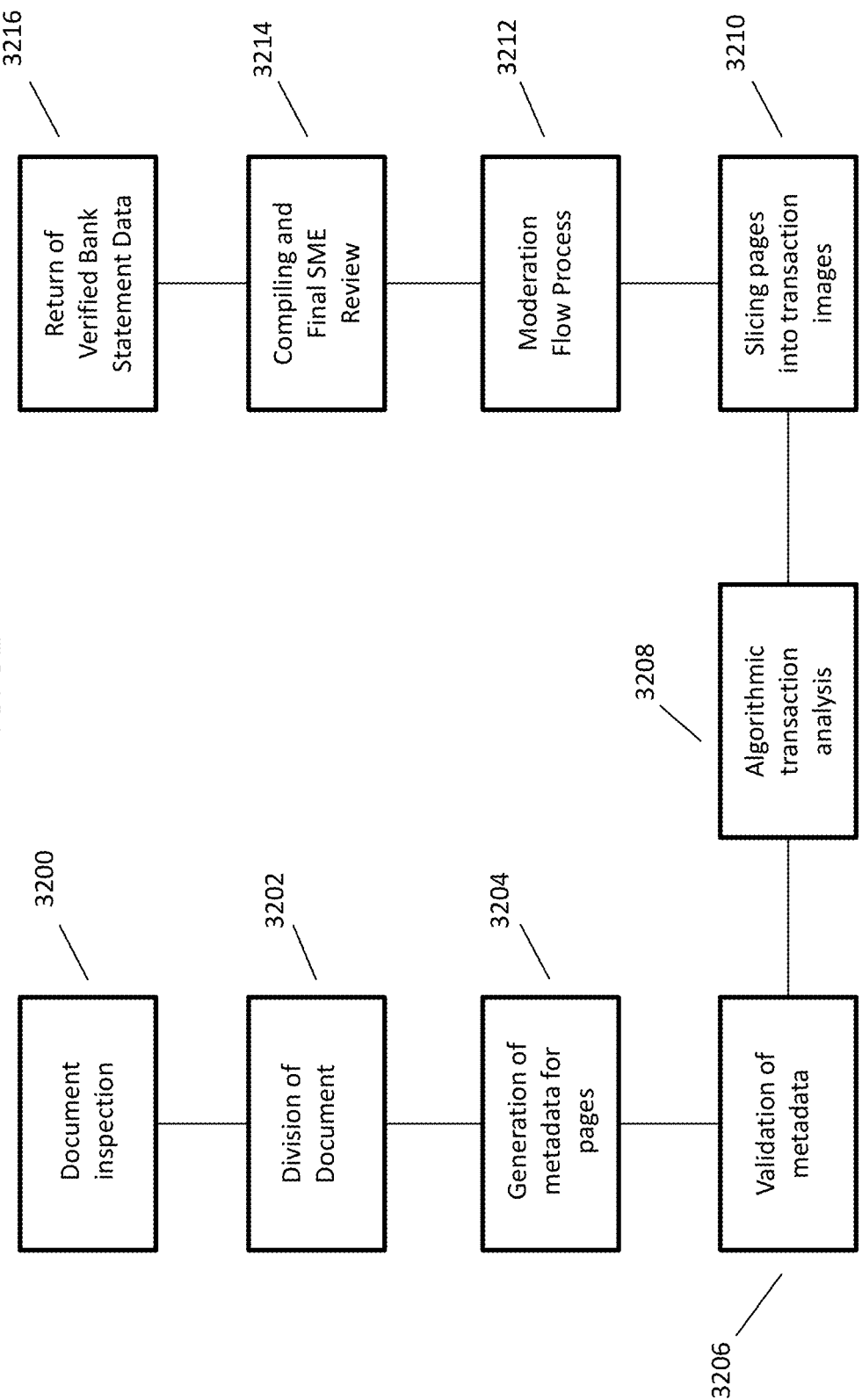
FIG. 32 is an example of a workflow for a portion of a review process according to an embodiment of the present disclosure.

In one or more embodiments, as shown in FIG. 32, implemented through user interaction, a hierarchy of bank statement data is used to optimize the parallelization of user tasks in order to achieve the fastest overall turnaround of bank data to clients as well as to minimize bottlenecks in labor utilization. In step 3200 a document is inspected by a user. After initial inspection by the user, to ensure documents will be properly processed, in step 3202, the document is divided into groups of pages. In step 3204, sets of metadata for each group of pages are automatically generated algorithmically, and in step 3206, the metadata is then validated by user review. In step 3208, each page within a group of pages is then automatically analyzed algorithmically to identify predefined transactions and/or the nature of the transaction, each predefined transaction is annotated, and then each page is displayed individually with the annotated algorithmically-recognized transactions. The annotations may include, for example, highlighting of the algorithmically-recognized transactions, or placement of bounding boxes around the algorithmically-recognized transactions, or different color shading of the algorithmically-recognized transactions. The bounding box coordinates that were determined in the OCR process prior to the document entering the BO Tool, are used to highlight each individual transaction. The BO Tool displays an image of the transactions with their bounding boxes shaded, as shown in FIG. 33.

The annotations may also be used to denote or represent different, algorithmically-inferred accounts. In one or more embodiments, a user review is implemented for purposes of quality control, which includes review of each page and confirmation that all transactions are properly bounded and shaded. As part of the user review, the user will review the polarity (+/−) sign of the transaction, as automatically assigned by the algorithm. For example, the polarity sign of the transaction may be denoted with an icon in the bounding box. Any errors in the automatically generated identifier may be corrected by the user through interaction with the system.

In one or more embodiments, using the BO Tool, the user is able to quickly scan through the transactions and rectifies any errors in the algorithmically-inferred polarity (+/−) of the transaction. The BO Tool displays the sign of each transaction to the left of the bounding box, and the user views the transactions, judges whether the displayed signs are correct, and in the case that they are not, rectifies any errors through a radio editing button.

In step 3210, each relevant page is sliced into transaction images, for example, from within bounding boxes. In step 3212, a Moderation Flow process begins. In Moderation Flow, the system prompts the user to verify transactional and account data from snippets until reconciliation is achieved. After reconciliation, in step 3214, the edited transaction and account data is compiled into Final SME Review, Final SME Review includes a page-by-page human review of all data from each bank document. After Final SME Review, in step 3216, the verified bank statement data is returned to the customers through either a web application or an API.

Figure 34:
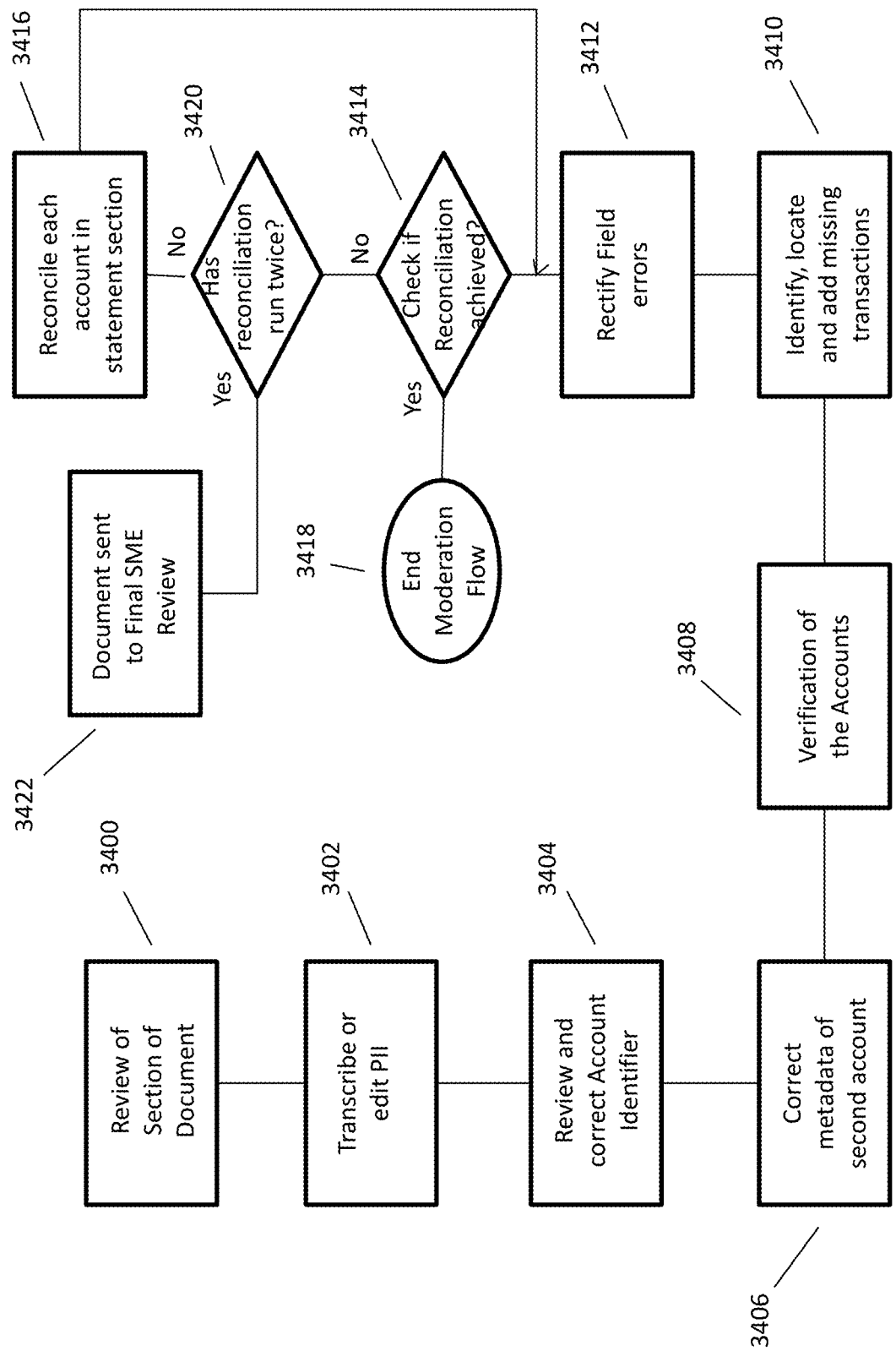
FIG. 34 is an example of a workflow for a portion of a review process according to an embodiment of the present disclosure.
Figure 35:
FIG. 35 is an exemplary depiction of a "snapshot" image of a page from the original uploaded showing a data entry portion and an annotated portion for correcting data according to an embodiment of the present disclosure.

In one or more embodiments, a review process, as shown in FIG. 34, is implemented after either of steps 2814, 2816 or 2818 of FIG. 28. This process begins after the system has divided the document into the various sections, as described above. In step 3400, a section of the document is presented for review. The review of the section of the document may be accomplished automatically through an artificial intelligence system, such as a machine vision system, or may be implemented by a user undertaking a manual review of the section of the document, or a combination of both. In one or more embodiments, in step 3402, the account holder's Personal Identifiable Information (PII) and the account metadata, such as, for example, information that applies to the entire account within a statement, as shown in FIG. 35, is transcribed or edited automatically through an artificial intelligence system, such as a machine vision system, or may be implemented by a user undertaking a manual review of the section of the document, or a combination of both.

In one or more embodiments, in step 3404, the accuracy of the account number, bank name, and account type (e.g., checking, savings, etc.) may be reviewed and confirmed automatically by the system or manually by a user. The combination of the account number, bank name and account type is colloquially called the Account Identifier. The back-end OCR and transaction detection algorithms will attempt to automatically identify this data and auto-populate the corresponding fields, as shown in FIG. 35. This automatic identification can be subjected to quality control by an automated review, for example, through an artificial intelligence system, such as a machine vision system, or by a manual review by a user for the purpose of comparing the fields to the data as it appears on the document, such as, for example, the bank statement, and to rectify any errors that are generated by the automated system. In the event that the automated system cannot resolve the bank name and account type, the corresponding field will be left blank. In the automated review, the system, and in the manual review, the user, will enter the correct data into the blank fields. Alternatively, or additionally, a dropdown menu will present the most probable autocompletion possibilities, from which the user may choose.

When the document represents a bank statement, because some statements are consolidated, i.e., they contain information from multiple accounts, such as a joint checking and savings statement, metadata for multiple accounts within a section may need to be created. In step 3406, this metadata creation may be accomplished automatically through an artificial intelligence system, such as a machine vision system, or may be implemented by a user undertaking manual data input into the section of the document, or a combination of both. When the system, automatically, or a user, manually, creates a second account within the section, some of the metadata from the first account is automatically transcribed to the second account. The automatic transcription saves time because much of the metadata from the first account, such as account holder Personally Identifiable Information and bank name, also applies to the second account. The system, automatically, or the user, manually, will change the second account's metadata to reflect whatever discrepancies exist between the second account's data and the back end's data.

In one or more embodiments, in step 3408, verification of the account numbers is accomplished automatically through an artificial intelligence system, such as a machine vision system, or is implemented manually by a user. This task is only necessary when there are two or more accounts on the same page, in a section of bank statements. The account of each transaction is resolved from the list of different accounts created as described above, and is ultimately determined automatically through an artificial intelligence system, such as a machine vision system, or by human judgment. The bounding boxes are shaded in different colors by account, which serve as a visual identifier for the automated or manual verifier, allowing the verifier to quickly determine if the transactions are assigned correctly.

In step 3410, missing transactions are identified, located and added, and extraneous non-transactions are deleted. Missing transactions are those which were not recognized by the back end algorithm and thus not shaded on the BO Tool with a bounding box. Non-transactions are bounding boxes that do not envelope a transaction. Non-transactions are deleted automatically through an artificial intelligence system, such as a machine vision system, or manually by the simply by clicking on the "x" to the right of the bounding box. Missing transactions are located by the automated system by adding, or manually by a user by dragging, a box around the missing transaction. When a missing transaction is located and added, the automated system or the user will assign it to an account and assign polarity. Actions such as deletions and assignments of account and polarity can be performed automatically by the system on multiple transaction at once, or manually on multiple transaction at once by holding a key down while selecting them.

In one or more embodiments, the transaction date, description and amount of the highlighted transaction are viewable for the purpose of identification, but are not editable in step 3410. Accordingly, when a missing transaction is added, the fields for date, description and amount will be blank. This information will undergo OCR in a later machine step.

In step 3412, after all of the transactions have been split into 'snippets', the transactions, i.e, the image within the bounding boxes from transactions are displayed to the user. Below each image are fields for the corresponding date and description. The fields are populated with the respective OCR outputs, and the system and/or the user must rectify any errors in the fields, as shown in FIG. 36.

At this point, the system has enough information to determine whether the transactional data from the statement section is correct, or whether an error has occurred. In step 3414, the determination is made using reconciliation, which is based on the premise that the arithmetic difference between the ending balance and the beginning balance of a statement must equal the sum of the amounts of all transactions.

If the statement does not reconcile, meaning at least one error has occurred, in step 3416, reconciliation is conducted for each account within a statement section. Step 3416 is undertaken only in the case that one or more accounts in a statement section do not reconcile.

A failure for an account to reconcile means that either the data from one or more transaction amounts is incorrect, and/or the data of the account balances is incorrect. It is more efficient to check for errors in the account balances before checking for errors in the transactions. Thus, the program displays the snippets of beginning and ending balances and their corresponding values, as shown in FIG. 37. The system, automatically through an artificial intelligence system, such as a machine vision system, or manually by a user undertaking manual data input into the section of the document, or a combination of both, checks for and rectifies errors in the beginning and ending account balances. Once the monthly balances have been validated, the system will attempt to reconcile all accounts. If reconciliation is achieved for all periods within all accounts, then Moderation Flow will end and the last step, Final SME Review, will begin.

If reconciliation is not achieved, then in step 3416, the user is displayed the transaction snippets for each account period that did not reconcile. Below each image is a field for the dollar amount. The field is populated with the OCR output, and the system, automatically through an artificial intelligence system, such as a machine vision system, or manually by a user undertaking manual review, any errors in the field are rectified. After each transaction amount is validated, the program will attempt to reconcile the accounts. If the accounts reconcile, in step 3418, Moderation Flow will end. If the accounts fail to reconcile the above process is repeated a second time. In step 3420, if the account balances still do not reconcile, in step 3422, the document section is sent to Final SME Review for further inspection. The status of the reconciliation will be displayed to the user in the last step, Final SME Review.

In step 3422, the Final SME Review, the transactional and other bank data is culled from all microtasks and presented to the user. The data presented to the user during Final SME Review, as shown in FIG. 38, presents a visual summary of the bank data for the purposes of reviewing, editing and finalizing before it is tabulated and returned to the client, either through a web application or API.

Some symbols representing transactional information are simultaneously visible to the reviewer for all transactions. Other pieces of data are only visible for one transaction at a time, and are presented to the user when that transaction is clicked on.

The information that is always visible to the reviewer includes the polarity (+/− sign), the reconciliation status (red or green color) and several others, including:

Green "M": If the balances tie then there will be a green "M" next to the amount. A user does not have to verify amounts in these cases.

Red "M": If the balances do not tie the "M" will be in red and will indicate to the groomer that he/she needs to verify each amount individually. In the event, there is a mistake in one of the amounts or balances, the groomer must make the update and hit "save."

Red Exclamation Point: This means that the date and/or description and amount was marked as "unreadable" and did not go through the entire process of verification. Transactions with this marker need to have the dates/descriptions and amounts verified.

A red "R" on the transaction signifies that the running balances do not tie. In these situations a user must look at each transaction with the "R" and ensure that the amount is correct. If it is not, it needs to be edited.

Duplicate Detection: Any transaction with the "dupe" symbol means that there is a high percentage chance that there are duplicate transactions contained in the statement (see, e.g., FIG. 39). For example, sometimes checks appear in the main section of transactions on a statement and also in a separate section that contains check images. Duplicates must be identified and removed so that the tabulated list of transactions that is returned to the client does not contain multiple entries for the same transaction. Thus, the user will click on the transaction, and the corresponding transactions that are most likely to be a duplicate will be shaded more prominently. The user will examine the different possibilities and determine whether the transaction is a duplicate. If the pair is in fact a duplicate, the user must select the "x" to the right of the bounding box (and to the immediate left of the "dupe" symbol) to delete it from the database.

As shown in FIG. 40, the data that is visible for a single transaction is presented in the panel on the right hand side.

It includes Transaction Type, Account, Statement Period, Transaction Date, Description and Amount.

Figure 41:
FIG. 41 is an exemplary depiction of a "snapshot" image of a page from the original uploaded showing a portion for reconciliation of data according to an embodiment of the present disclosure.
Figure 41:
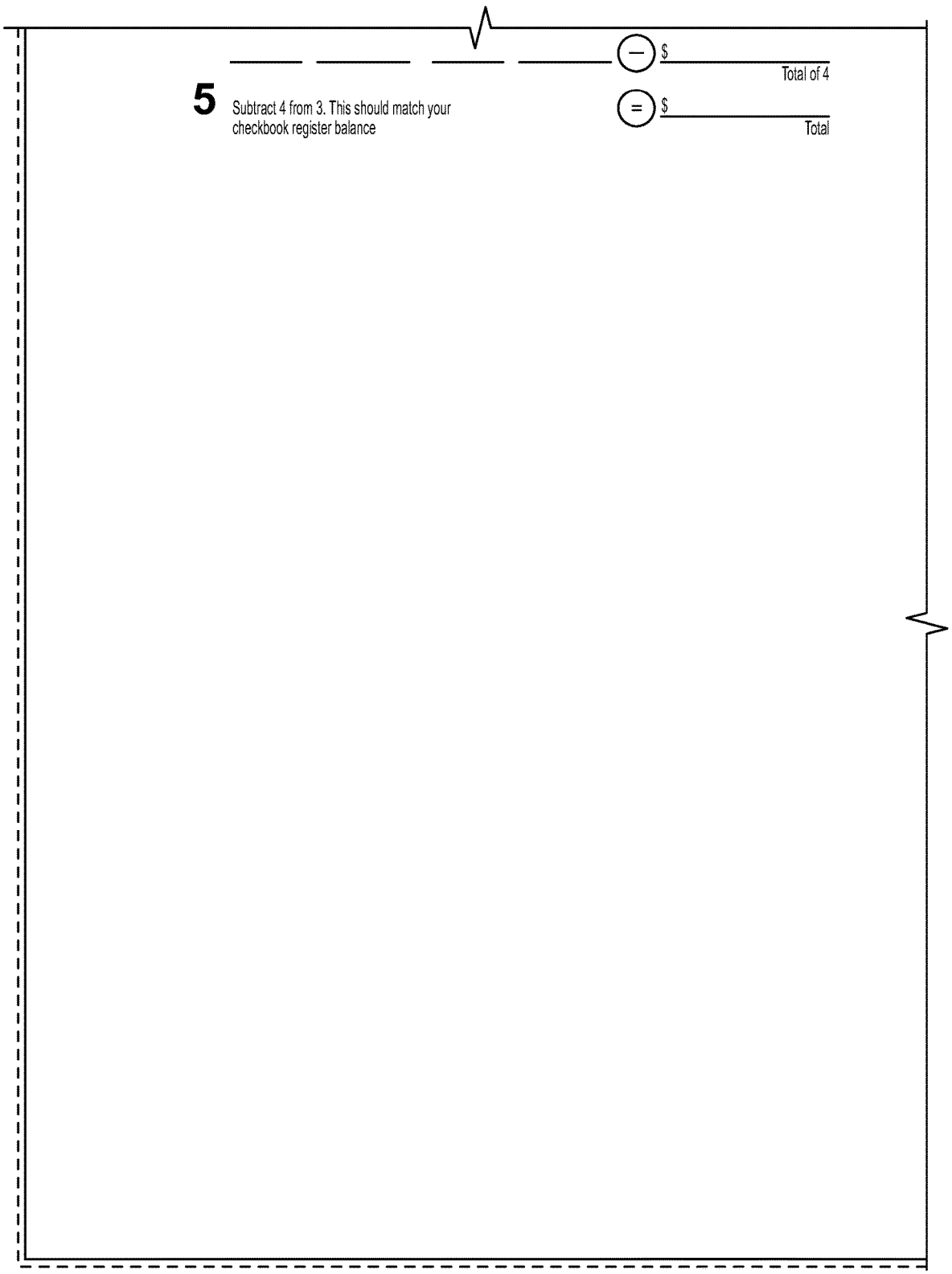

As shown in FIG. 41, other pieces of data apply to a group of transactions that are tied to a particular account, though only data from one transaction at a time is shown: Statement Period, Beginning Balance (if applicable), Ending Balance (if applicable), Begin Date, End Date, Account Number, Bank i.e. financial institution, and account Type.

Figure 42:
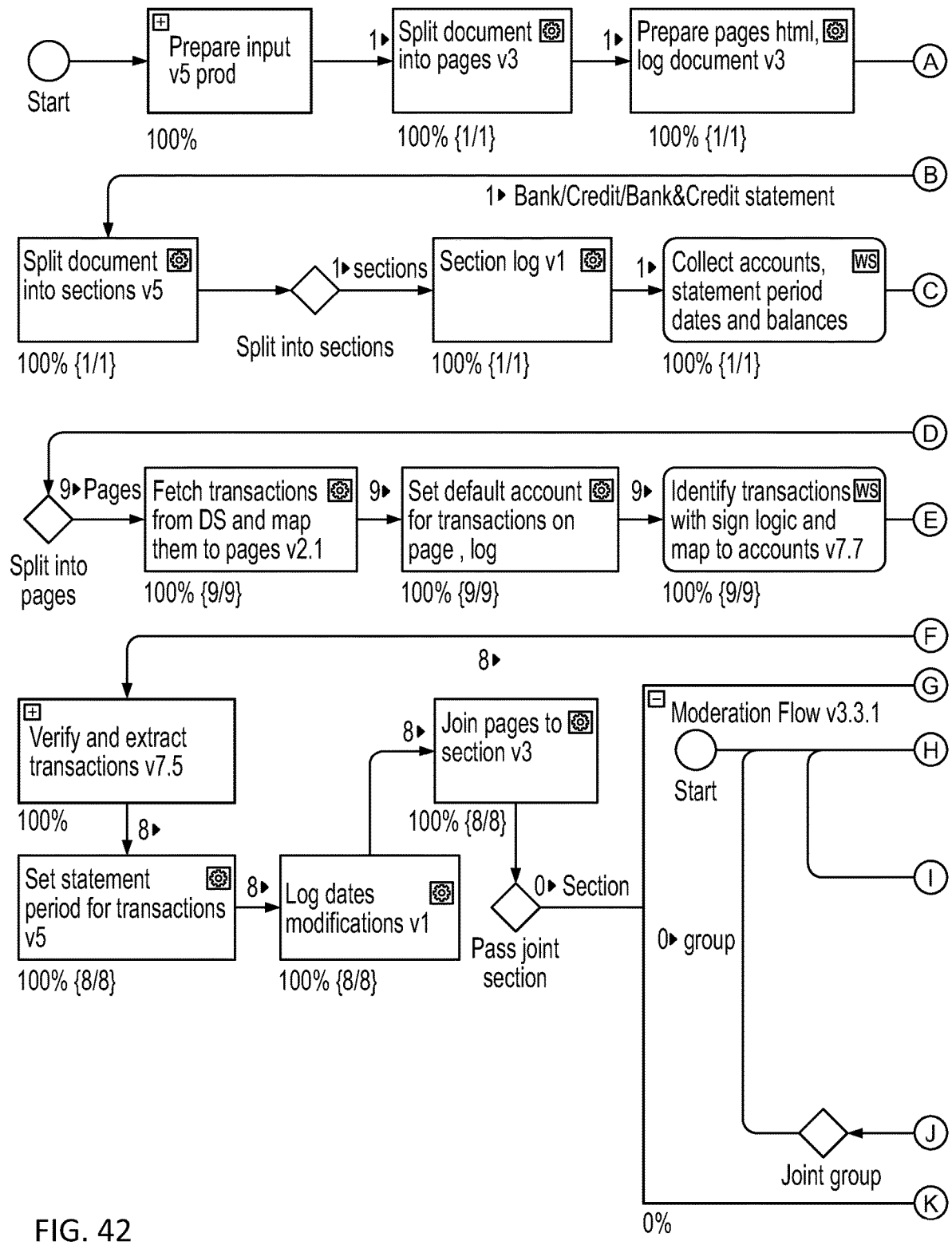
FIG. 42 is an example of a workflow for a review process according to an embodiment of the present disclosure.
Figure 42:
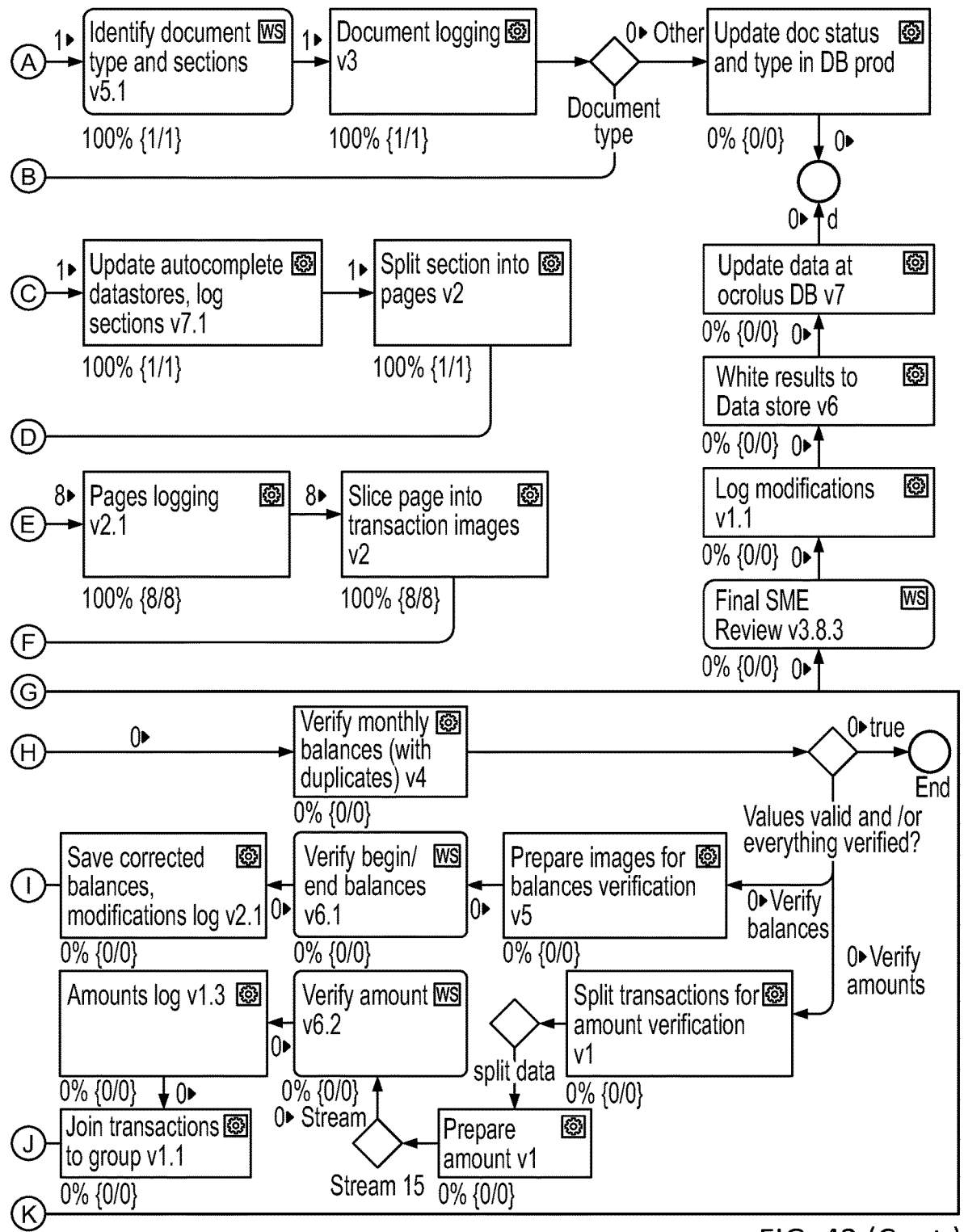

As shown in FIG. 42, there is depicted a process for analyzing a document according to an embodiment of the present disclosure. First, a document is input into the system, where it is split into different pages, and then prepared as separate pages. Next, a document type and sections are identified, following which the document is logged, and the document status is updated in a database. From the document logging, the document is split into different sections, which are then logged. The system collects accounts, statement period dates and balances. The autocomplete data stores are updated with this information and the sections are logged. Next, the different sections are split into separate pages. Next, transactions are fetched from the data store and they are mapped to the different pages, and a default account is set for the transactions on each page. Next, the transactions are identified with sign logic and are mapped to the associated account, after which the pages are again logged. Next, the pages are sliced in to transaction images and then transactions are verified and extracted, and a state management period is set for each transaction. The dates and modifications are then logged. Next, pages are joined to sections to accurately reflect the transactions and accounts, where the process moves to Moderation Flow. In Moderation Flow, monthly balances are verified. Transactions are split for amount verification, amounts are prepared and verified, amounts are logged and joined to the transaction for a particular corresponding group and then verified. Additionally, images are prepared for balances verification, beginning and end balances are verified and corrected balances are saved and modifications are logged, and the monthly balances are then verified. Upon completion of Moderation Flow, the information is sent for Final SME Review. In Final SME Review, modifications are logged, the results are written to the data store, and the data is updated in the database.

The system offers guidance as to which transactions are most likely to need editing. The system also attempts to infer which transactions are more likely to be erroneous among a set of transactions that fail reconciliation. The system computes the probability based on various factors, such as, for example, OCR confidence on a character and word basis as well as the type of statement and type of transaction. For example, in one or more embodiments, those transactions that are more likely to be erroneous are bounded in a darker shade of red compared to transactions that are less likely to be erroneous.

After reconciliation has been achieved, or when the automated system determines or the user conducting the Final SME Review believes that the data is sufficiently accurate, the results will be sent to the client. The bank statement data that was validated in the BO tool will be stored in a database. The client can then request the data using the API or interact with the data in a web application, such as for example, a PerfectAudit web app.

Hence, aspects processing and manipulating transaction data using OCR and data transactions, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In an embodiment, the described systems and methods may be implemented in the device operating system and applied to all geo-location information. In an embodiment, the described systems and methods are implemented using a preloaded application. In an embodiment, the systems and methods described herein are implemented using middleware between the operating system and an application. In an embodiment, the systems and methods are implemented in a cloud-based environment, where the device and application are in constant communication with a cloud-based server. In such an embodiment, the system's requests for measurements are all sent to the device and all measurements are sent back to the cloud. In an embodiment, the described methods may be implemented in a stand alone device without internet connectivity.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire line, optical fiber cable, radiofrequency (RF), etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

It will be understood that those skilled in the art, both now and in the future, can make various improvements and enhancements which fall within the scope of the claims which follow.

The invention claimed is:

1. A method comprising:
preprocessing, by a microprocessor, a document image;
recognizing, by the microprocessor, a set of textual data in the document image;
identifying, by the microprocessor, a group of sets of alphanumeric data distributed along a plurality of horizontal planes that are substantially parallel to each other and along a plurality of vertical planes that are substantially parallel to each other, wherein each set of alphanumeric data of the group of sets of alphanumeric data includes a plurality of alphanumeric segments extending along a respective horizontal plane spaced apart according to a respective vertical plane;
identifying a first set of the alphanumeric data;
identifying a second set of the alphanumeric data, wherein the second set of alphanumeric data is determined, by the processor, to correspond to the first set of alphanumeric data based on at least one of a logical correlation between the first set of alphanumeric data and the second set of alphanumeric data or a logical correlation of the first set of the alphanumeric data and the second set of alphanumeric data to a predefined alphanumeric data template external to the document image;
annotating, by the microprocessor, the first set of alphanumeric data by modifying, by the microprocessor, a feature of the first set of alphanumeric data;
analyzing, by the microprocessor, the first set of alphanumeric data as annotated such that the first set of alphanumeric data is identified as a first transaction with an alphanumeric key identifier;
analyzing, by the microprocessor, the second set of alphanumeric data such that the second set of alphanumeric data is identified as a second transaction different from the first transaction based on the alphanumeric key identifier such that a logical correlation between the first transaction and the second transaction is determined by the microprocessor;
determining, by the microprocessor, based on the logical correlation, whether a conversion of the first set of alphanumeric data or the second set of alphanumeric data is at least one of without an error or with the error; and
taking, by the microprocessor, an action based on the conversion of the first set of alphanumeric data or the second set of alphanumeric data is at least one of without the error or with the error.

2. The method of claim 1, wherein the preprocessing includes at least one of de-skewing, de-specking, binarization, line removal, layout analysis, zoning, line detection, word detection, character isolation, segmentation, applying a lexicon, near neighbor analysis, grammatical analysis, applying Benfords law, or any combinations thereof.

3. The method of claim 1, wherein the preprocessing identifies at least a portion of the plurality of transactions and transaction types.

4. The method of claim 1, wherein each unique transaction is at least one of recognized, identified, organized, extracted, or tabulated into a database.

5. The method of claim 1, wherein the document is a bank statement or a credit card statement.

6. The method of claim 5, wherein the alphanumeric key identifier is at least one of a running balance, identified total, account number, or date range.

7. The method of claim 5, wherein the extracted bank statement or credit card statement account balances are used to autonomously identify deemed OCR conversion errors.

8. The method of claim 1, wherein identified deemed errors are presented on a graphical user interface in conjunction with the original portion of the document image corresponding to the first set of alphanumeric data for comparison purposes.

9. The method of claim 1, further comprising storing the first set of alphanumeric data in a data store, wherein the first transaction comprising the first set of alphanumeric data in the data store is linked back to the original location on the document image.

10. The method of claim 1, further comprising flagging transactions that are deemed to include an identified error.

11. The method of claim 1, wherein the alphanumeric key identifier is used to identify and flag deemed OCR conversion errors.

12. The method of claim 1, further comprising editing the alphanumeric data to provide for conversion without errors.

13. The method of claim 12, wherein upon editing of at least one portion of alphanumeric data identified as a deemed error, the remaining portions of alphanumeric data, which may have been identified as deemed errors are automatically reevaluated based on the edits.

14. The method of claim 1, wherein the annotating includes tagging or flagging at least one of the first transaction or the second transaction verified as accurate, the first transaction or the second transaction identified as containing an error, or the first transaction verified as accurate and the second transaction identified as containing an error.

15. The method of claim 14, wherein the at least one of the first transaction or the second transaction verified as accurate is tagged or flagged in a first color and the at least one of the first transaction or the second transaction identified as containing an error is tagged or flagged in a second color.

16. The method of claim 9, further comprising searching the data store for one or more transactions.

17. The method of claim 16, wherein the graphical user interface includes a user created button for saving an advanced search parameter for searching the data store.

18. The method of claim 17, wherein the graphical user interface includes a slider button to set a closeness value for a search parameter for searching the data store.

19. The method of claim 16, further comprising setting at least one of the first transaction or the second transaction as an anchor transaction to use as basis for an advanced search.

20. The method of claim 19, further comprising identifying a recurring transaction using the anchor transaction as the basis for the search.

\* \* \* \* \*